United States Patent
Benton et al.

(10) Patent No.: US 12,403,645 B1
(45) Date of Patent: Sep. 2, 2025

(54) ATHLETIC EQUIPMENT HEAT-SHRINK SHEATH THERMAL CHAMBER

(71) Applicant: Caddy Wrap LLC, Prairie Village, KS (US)

(72) Inventors: Adam Benton, Prairie Village, KS (US); Bradley Benton, Springfield, MO (US); Cory Fisher, Mission Hills, KS (US)

(73) Assignee: Caddy Wrap LLC, Prairie Village, KS (US)

(*) Notice: Subject to any disclaimer, the term of this patent is extended or adjusted under 35 U.S.C. 154(b) by 0 days.

(21) Appl. No.: 19/172,356

(22) Filed: Apr. 7, 2025

Related U.S. Application Data

(60) Provisional application No. 63/631,321, filed on Apr. 8, 2024.

(51) Int. Cl.
*B29C 63/00* (2006.01)
*B29C 63/18* (2006.01)
(Continued)

(52) U.S. Cl.
CPC ......... *B29C 63/0004* (2013.01); *B29C 63/18* (2013.01); *B29K 2101/12* (2013.01); *B29L 2031/52* (2013.01)

(58) Field of Classification Search
CPC ... B29C 63/004; B29C 63/18; B29K 2101/12; B29L 2031/52
See application file for complete search history.

(56) References Cited

U.S. PATENT DOCUMENTS 4,016,640 A * 4/1977 Briggs .................. B23P 11/022
473/568
5,962,368 A * 10/1999 Poole .................. B41M 5/0353
156/277
(Continued)

FOREIGN PATENT DOCUMENTS

AU 2004100054 A4 2/2004
AU 2017272263 A1 6/2019
(Continued)

OTHER PUBLICATIONS

Notice of Allowance received for U.S. Appl. No. 19/172,025, mailed on Jul. 15, 2025, 9 pages.
(Continued)

*Primary Examiner* — Lucas E. A. Palmer
(74) *Attorney, Agent, or Firm* — SHOOK, HARDY & BACON L.L.P.

(57) ABSTRACT

A sheath for protecting an athletic equipment shaft is formed from a heat-shrink material. The heat-shrink material is heated within a thermal chamber designed to effectively and intentionally expose the heat-shrink material to a controlled heating environment. This controlled heating environment ensure a quality application of the heat-shrink material. The thermal chamber includes an enclosure defining an interior volume such that the interior volume is capable of holding the heat shrinkable sheath surrounding a portion of an athletic equipment shaft. The thermal chamber includes a first shaft support aperture extending through a first end of the enclosure, a second shaft support aperture extending through a second end of the enclosure, and an inlet aperture extending through the first end of the enclosure, wherein the inlet aperture provides a fluid communication port allowing pressurized air to pass from an exterior of the enclosure to the interior volume.

20 Claims, 10 Drawing Sheets

(51) Int. Cl.
  *B29K 101/12* (2006.01)
  *B29L 31/52* (2006.01)

(56) References Cited

U.S. PATENT DOCUMENTS

| | | | |
|---|---|---|---|
| 6,139,451 A | 10/2000 | Hillerich, III et al. | |
| 6,775,891 B1* | 8/2004 | Tsiguloff | B25B 27/28 29/235 |
| D549,794 S | 8/2007 | Hansen | |
| 8,226,789 B1* | 7/2012 | Glaser | B29C 63/0073 156/212 |
| 9,254,612 B2 | 2/2016 | Bahr et al. | |
| 2002/0101001 A1* | 8/2002 | Anderson | B29C 39/10 264/275 |
| 2007/0240799 A1* | 10/2007 | Hansen | A63B 53/12 473/316 |
| 2009/0124409 A1 | 5/2009 | Greeves | |
| 2009/0305810 A1 | 12/2009 | Kim | |
| 2015/0080145 A1* | 3/2015 | Roller | B29C 63/42 473/282 |
| 2021/0295744 A1 | 9/2021 | Ray | |
| 2022/0023726 A1 | 1/2022 | Yamamoto | |

FOREIGN PATENT DOCUMENTS

| | | | | |
|---|---|---|---|---|
| CN | 201220480 Y | * | 4/2009 | |
| CN | 201261261 Y | * | 6/2009 | |
| CN | 103722643 A | * | 4/2014 | |
| CN | 205150423 U | * | 4/2016 | |
| CN | 205522468 U | * | 8/2016 | |
| CN | 210259084 U | * | 4/2020 | |
| CN | 114523660 A | * | 5/2022 | B01D 53/8668 |
| CN | 216732606 U | * | 6/2022 | |
| CN | 115957491 A | | 4/2023 | |
| GB | 2323296 A | * | 9/1998 | A63B 60/14 |
| SU | 1736728 A1 | * | 5/1992 | |
| WO | WO-9110355 A | * | 7/1991 | |
| WO | 2008026866 A1 | | 3/2008 | |
| WO | WO-2019084626 A1 | * | 5/2019 | A63B 60/60 |
| WO | 2019/109149 A1 | | 6/2019 | |

OTHER PUBLICATIONS

European Patent Office as ISA, International Search Report and Written Opinion received for PCT Patent Application No. PCT/US2025/023475, mailed on Jun. 24, 2025, 10 pages.

European Patent Office as ISA, Invitation to Pay Additional Fees received for PCT Patent Application No. PCT/US2025/023487, mailed on Jul. 7, 2025, 12 pages.

\* cited by examiner

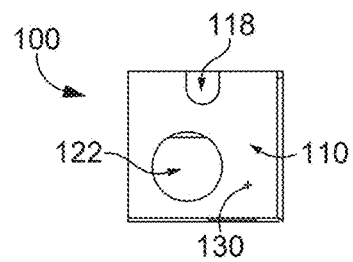
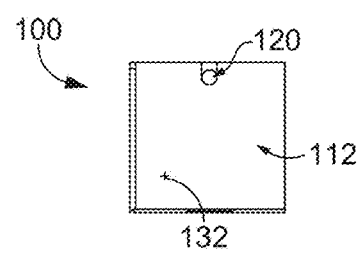
FIG. 3   FIG. 4
FIG. 5
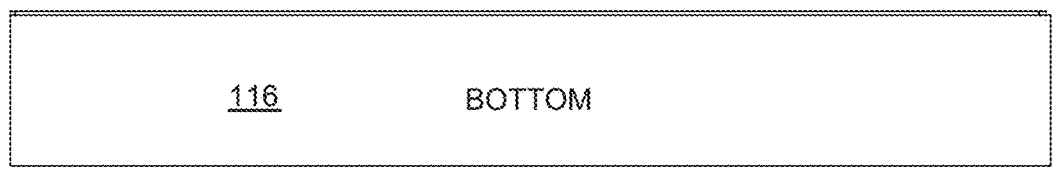
FIG. 6
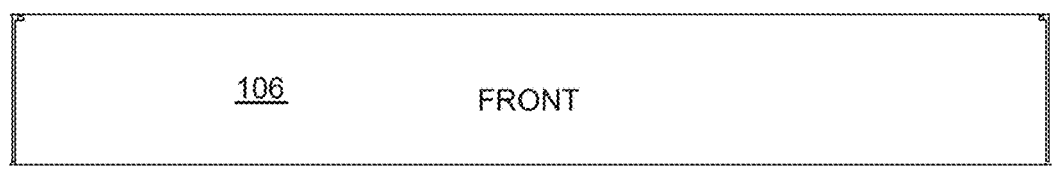
FIG. 7
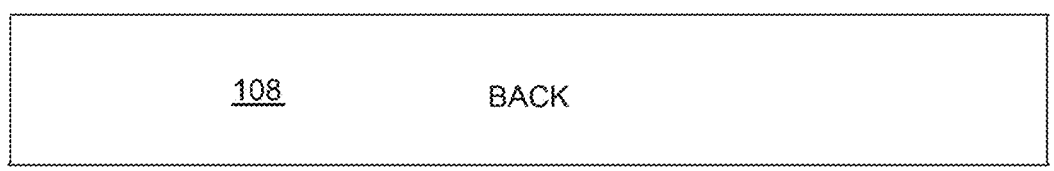
FIG. 8

ATHLETIC EQUIPMENT HEAT-SHRINK SHEATH THERMAL CHAMBER

CROSS REFERENCE TO RELATED APPLICATIONS

This application claims the benefit of U.S. Provisional Application No. 63/631,321 filed on Apr. 8, 2024, which is incorporated herein by reference in its entirety.

This application is related by subject matter to U.S. Nonprovisional application Ser. No. 19/172,025 filed on the same date of Apr. 7, 2025, and titled ATHLETIC EQUIPMENT SHAFT PROTECTIVE HEAT-SHRINK SHEATH, which is incorporated herein by reference in its entirety.

TECHNICAL FIELD

The present disclosure is directed to a thermal chamber effective for the controlled and consistent heating of a heath-shrink sheath around a shaft.

BACKGROUND

Athletic equipment components, such as a golf club shaft, are generally formed from materials providing a specific functional benefit associated with the goal of the athletic equipment. The functional benefit may be associated with a desired result to be achieved by the athletic equipment. For example, a golf club shaft may be formed from a graphite composition that is beneficial in enhancing a drive distance for a struck golf ball. Unfortunately, a material selected for the benefit of the athletic results to be achieved, such as a longer drive with a golf club having a graphite shaft, may not provide superior wear resistance, scratch resistance, or even aesthetics within the environment intended for their use. As such, a protective sheath may be applied to the athletic shaft. The sheath may be formed from a heat-shrink material. Application of a heat-shrink sheath to the shaft is done by the application of heat to the heat-shrink sheath causing the sheath to contract around the athletic shaft forming a protective layer that conforms to the underlying shaft.

DETAILED DESCRIPTION OF DRAWINGS

Subject matter of the present disclosure associated with an athletic equipment protective sheath is described in detail below with reference to these figures.

FIG. 3 depicts a first end view of the thermal chamber, in accordance with aspects hereof;

FIG. 4 depicts a second end view of the thermal chamber, in accordance with aspects hereof;

FIG. 5 depicts a top view of the thermal chamber, in accordance with aspects hereof;

FIG. 6 depicts a bottom view of the thermal chamber, in accordance with aspects hereof;

FIG. 7 depicts a front view of the thermal chamber, in accordance with aspects hereof;

FIG. 8 depicts a back view of the thermal chamber, in accordance with aspects hereof;

DETAILED DESCRIPTION

Figure 1:
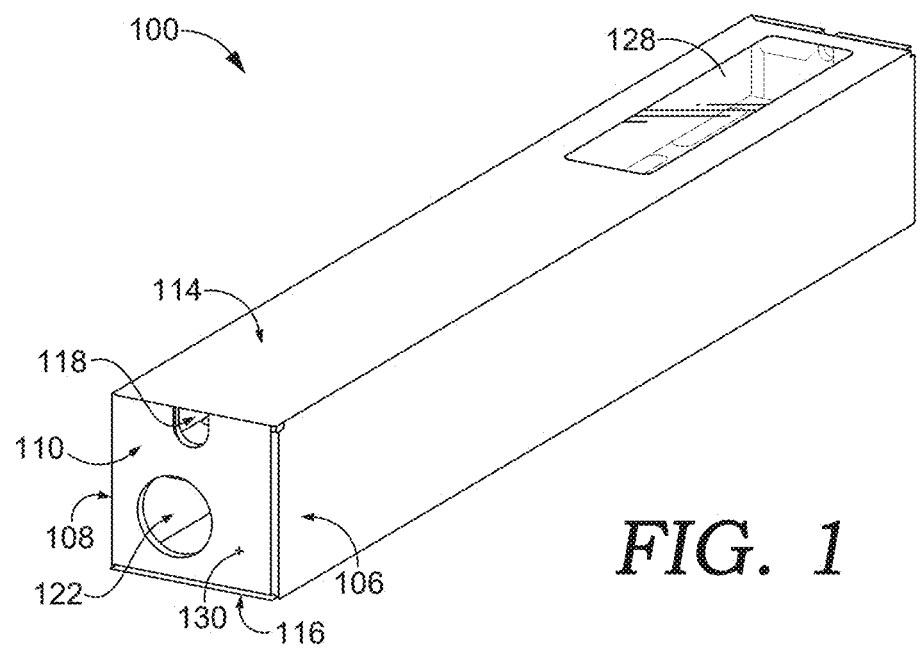
FIG. 1 depicts a first-end perspective view of a thermal chamber, in accordance with aspects hereof.
Figure 2:
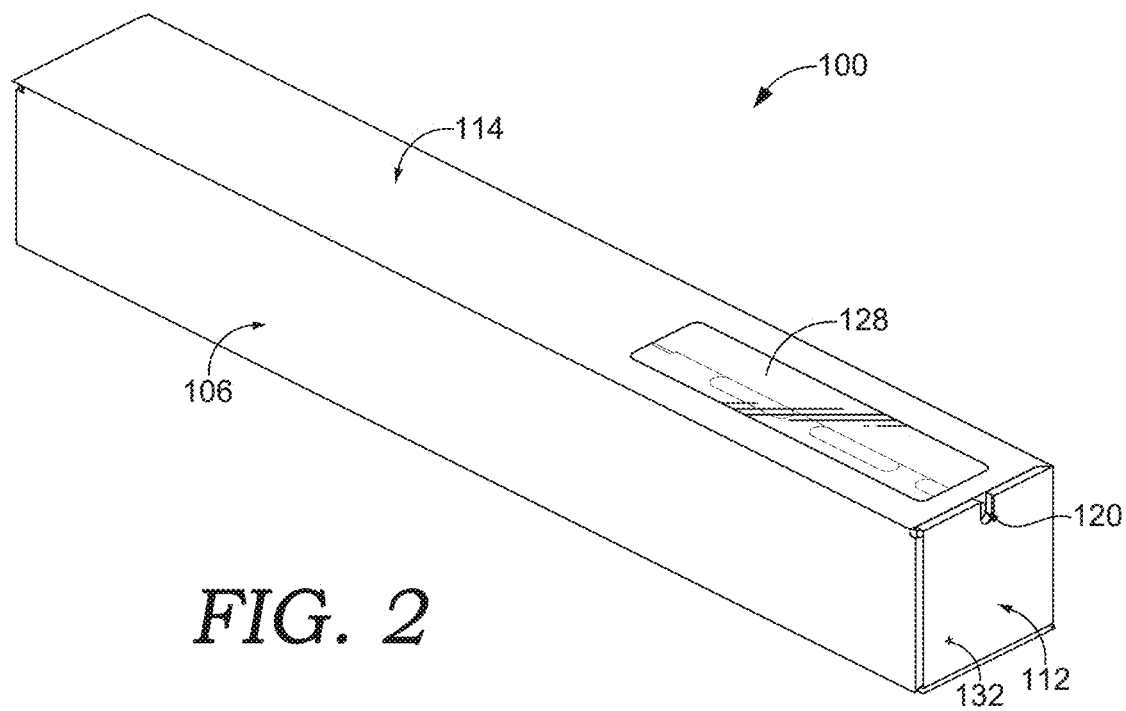
FIG. 2 depicts a second-end perspective view of a thermal chamber, in accordance with aspects hereof.

The present invention generally relates to a thermal chamber for applying heat-shrinkable sheaths to athletic equipment shafts. More specifically, aspects contemplated pertain to a thermal chamber designed to efficiently and uniformly heat a heat-shrink sheath positioned around an athletic equipment shaft, such as a golf club, ski pole, hockey stick, baseball bat, or other sports equipment shafts, causing the sheath to shrink and conform precisely to the shaft without the need for adhesive bonding.

Heat-shrinkable sheaths provide protective, aesthetic, or functional covering to athletic equipment shafts. These sheaths enable convenient replacement and customization, allowing athletes and manufacturers to enhance grip, improve shaft appearance, and extend shaft life without permanently modifying the underlying structure.

Traditional heat-shrink application methods often employ manual heating techniques such as handheld heat guns or liquid submersion baths, which typically result in uneven heating and inconsistent sheath compression or the introduction of foreign materials (e.g., water, oil) that may affect the underlying athletic equipment. Such inconsistencies can produce undesirable wrinkles, puckering, air pockets, or improper adhesion of the sheath to the shaft surface. Further, moisture-based solutions (e.g., submersion, steam) can cause the moisture to be trapped between the sheath and the shaft, potentially damaging the underlying shaft. Additionally, these conventional methods frequently use adhesives to secure sheaths, resulting in residues upon sheath removal, complicating subsequent sheath replacements and potentially obscuring visual elements like branding or measurement indicia. Adhesive residues also add unnecessary weight and variability, negatively impacting equipment performance.

Aspects contemplated provide precise temperature and airflow control that reduces energy consumption, reduces cycle times, and decreases risk of damaging the sheath or shaft due to overheating. The aspects contemplated demonstrate a clear and longstanding need for an improved thermal chamber capable of overcoming these traditional drawbacks.

The thermal chamber is specifically designed to effectively and uniformly apply heat-shrink sheaths onto athletic equipment shafts. The thermal chamber comprises a dedicated shaft chamber portion, a controlled air distribution chamber, and strategically arranged air distribution apertures to facilitate precise, consistent, and uniform heating of the sheath along the entire length of the shaft, in an aspect.

The thermal chamber is constructed from thermally insulating materials, such as corrugated compositions formed from polymers, cardboard, fiberboard, or other composite structures. The thermal chamber optimizes energy efficiency, maintains internal temperature consistency, and reduces external surface temperatures for improved operational benefits.

The thermal chamber includes receiving slots that securely accommodate athletic equipment shafts of various diameters, lengths, and configurations, allowing versatility across different types and models of athletic equipment. A hinged or otherwise operable top provides convenient access to the chamber's internal volume, ensuring simple insertion, accurate positioning, and swift removal of equipment.

An airflow management system employs an inlet aperture connected to an external heating source, such as a hair dryer, and positioned distribution apertures direct airflow around specific shaft regions requiring targeted heat application. This design ensures optimal sheath shrinkage, significantly reduces instances of wrinkling and uneven compression, and enables tuned control over the heating process. This is useful in situation with variable shaft diameter (e.g., taper) or other inconsistencies along a length of the shaft.

In an example, eliminating adhesives entirely and relying exclusively on heat-induced compression, the heat-shrink sheaths avoids residue accumulation, maintains clarity and visibility of any underlying indicia or designs beneath transparent sheaths, reduces overall equipment weight, and simplifies sheath replacement procedures. Additionally, the design promotes consistent product quality, reduced production cycle times, and lower energy usage, resulting in substantial economic and environmental benefits.

The versatility of the thermal chamber allows its ready adaptation and customization to accommodate various shaft sizes, types, and configurations extending beyond golf clubs, to include golf hole pins/sticks/poles, ski poles, hockey sticks, baseball/softball bats, tennis racket handles, lacrosse sticks, and other similar shafted sports equipment.

This thermal chamber is contemplated to be useful for the application of a heat-shrink sheath for an athletic equipment shaft, such as a golf club shaft. The sheath, also considered a sleeve or tube, provides a replaceable protective covering to the athletic equipment shaft and the sheath is effective to provide a removable aesthetic to the athletic equipment shaft. The sheath is capable of being applied to the shaft without removing, in some examples, other components of the athletic equipment. For example, the sheath may be sized to pass over a golf club grip that is already overlaying a golf club shaft. The sheath is to be positioned on the golf club shaft between a golf club head and a portion of the grip and then the sheath is heated to shrink to a smaller circumference than the grip's outside circumference allowing the sheath to conform with a taper of the golf club shaft. Forming the sheath from a heat-shrink material that is effective to shrink substantially in a transverse direction with minimal contraction in a longitudinal direction allows for the sheath to be installed with minimal disruption to the athletic equipment while achieving a conformed fit with the athletic equipment shaft.

The sheath contemplated herein in an example is maintained in a position on the shaft through compression caused from a reaction by the sheath material in response to exposure with thermal energy, such as dry hot air. In an example, the sheath is not maintained on the shaft with an adhesive bonding the sheath to the shaft. The absence of adhesive between the sheath and the shaft prevents unwanted residual adhesive remaining on the shaft if the sheath is removed. Further, omitting adhesive as a bonding agent between the sheath and the shaft prevents the adhesive from disrupting or interfering with an external perception of a printed indicia on an inside surface of a transparent sheath. Stated differently, if adhesive was included to bond the sheath to the shaft, the adhesive may obscure one or more indicia printed on an interior surface of the sheath from being perceived as intended on the exterior of the sheath. Additionally, the reliance on compression instead of adhesive to maintain the sheath on the shaft reduces the weight of the sheath and limits the introduced variability to the performance of the shaft.

In some aspects, the techniques described herein relate to a thermal chamber for heat shrinking a sheath on an athletic equipment shaft, the thermal chamber including: an enclosure defining an interior volume such that the interior volume is capable of holding a heat shrinkable sheath surrounding a portion of an athletic equipment shaft; a first shaft support aperture extending through a first end of the enclosure; a second shaft support aperture extending through a second end of the enclosure, wherein the first shaft support aperture and the second shaft support aperture are capable of supporting the athletic equipment shaft; and an inlet aperture extending through the first end of the enclosure, wherein the inlet aperture provides a fluid communication port allowing pressurized air to pass from an exterior of the enclosure to the interior volume.

In some aspects, the techniques described herein relate to a thermal chamber including: an enclosure defining an interior volume such that the interior volume is capable of holding a heat shrinkable sheath surrounding a portion of an athletic equipment shaft, wherein the enclosure has a longitudinal length (e.g., distance between the first end/side and the second end/side) between 100 cm and 130 cm and the enclosure includes: a shaft chamber portion, an air distribution chamber portion, and an air distribution panel having a plurality of apertures extending there through, the air distribution panel separating the shaft chamber portion from the air distribution chamber portion such that the shaft chamber portion is a volume capable of maintaining the athletic equipment shaft and the air distribution chamber portion is capable of distributing a positive air pressure into the shaft chamber portion; and an inlet aperture extending through a first end of the enclosure, wherein the inlet aperture provides a fluid communication port allowing pressurized air to pass from an exterior of the enclosure to the interior volume and the inlet aperture has an area between 12 cm$^2$ and 62 cm$^2$, which allows for an appropriate volume of air at an appropriate pressure to pass into the enclosure within a defined time period.

In some aspects, the techniques described herein relate to a corrugated cardboard thermal chamber, the thermal chamber including: an enclosure defining an interior volume such that the enclosure includes an article chamber portion, an air distribution chamber portion, and an air distribution panel having a plurality of apertures extending there through, the air distribution panel separating the article chamber portion from the air distribution chamber portion such that the shaft chamber portion is a volume capable of maintaining the article and the air distribution chamber portion is capable of distributing a positive air pressure into the article chamber portion; and an inlet aperture extending through a first end of the enclosure, wherein the inlet aperture provides a fluid communication port allowing pressurized air to pass from an exterior of the enclosure to the interior volume.

In some aspects, the techniques described herein relate to a method of using a thermal chamber for heat shrinking a sheath on an athletic equipment shaft, the method including: inserting at least a portion of the athletic equipment shaft having a heat-shrink sheath surrounding a portion of the athletic equipment shafter into an interior volume of the thermal chamber; applying thermal energy into the interior volume of the thermal chamber such that a temperature within the interior volume exceeds 60 degrees C.; maintaining the temperature within the interior volume above 60 degrees Celsius for at least 1 minute; removing the athletic equipment shaft from the interior volume, wherein the heat-shrink sheath reduced in size from a first size prior to applying the thermal energy to a second size after maintaining the temperature within the interior volume above 60 degrees Celsius.

It is contemplated that the thermal chamber is heated to a temperature above 65 degrees Celsius. Specifically, it is contemplated that the thermal chamber is heated to a temperature of 90 degrees Celsius to 120 degrees Celsius for effective activation of the heat-shrink material within a 5-minute exposure. The heat may be generated by a hair dryer in the 1,000-2,000 watts range. In many situations, a hair dryer operates between 1200-1800 watts and is capable of achieving a temperature within the thermal chamber of 90 degrees Celsius to 120 degrees Celsius. As will be discussed in greater detail below, operating the thermal chamber at a temperature above 60 degrees Celsius is important for the activation of the contemplated heat-shrink material with a processing time that is acceptable. Further, having an internal temperature between 90-120 degrees Celsius allows for the cycle time to be under 4 minutes for the effective shrinking of a sheath around an athletic equipment shaft, in an example.

Turning to the figures, a thermal chamber 100 is depicted, in accordance with aspects hereof. Specifically, looking at FIGS. 1-8 depict the thermal chamber 100 in a first perspective view in FIG. 1, a second perspective view in FIG. 2, a first end view in FIG. 3, a second end view in FIG. 4, a top view in FIG. 5, a bottom view in FIG. 6, a front view in FIG. 7, and a back view in FIG. 8, in accordance with aspects herein. It is noted that while the thermal chamber 100 is illustrated in a particular manner in the figures, other structures, shape, sizes, and configurations are contemplated.

For example, FIGS. 1-8 illustrates the thermal chamber 100 as a prism structures. Specifically, the prism structure forming an enclosure in FIG. 1-8 has 6 rectangular faces. In an alternative contemplated constructions, the thermal chamber forms an enclosure having at least 5 faces (e.g., cross section of a triangle). In yet another contemplated example the thermal chamber forms an enclosure that is a cylindrical structure extending between a first end and a second end (e.g., circular ends). In all examples, the in-use configuration may be with a greater longitudinal length oriented in any manner, such as horizontally or vertically. The orientation allows for control of thermal variations within the enclosure. For example, in a horizontal configuration the airflow (discussed below) provides a degree of control for the variability in temperature experienced along the length of the longitudinal direction of the thermal chamber. In a vertical orientation, the height along a longitudinal direction impacts the temperature variability experienced within the enclosure. This temperature variability may be leveraged to apply a higher temperature (or lower temperature) to specific portions of an article being heated therein based on the portion of the article along a longitudinal length.

The thermal chamber 100 is comprised of a shaft chamber portion 102 and an air distribution chamber portion 104 that are separated by an air distribution panel 124 within a volume defined by a front 106, a back 108, a first side 110 (also referred to as a first end), a second side 112 (also referred to as a second end), a top 114, and a bottom 116. The first side 110 includes a first shaft slot 118, an inlet aperture 122, and a first securement 130. The second side 112 includes a second shaft slot 120 and a second securement 132. The top 114 also include a viewing window 128 allowing visible inspection of the internal volume through the top 114, such as visual inspection of the shaft chamber portion 102. The air distribution panel 124 comprises a plurality of air distribution apertures 126, as will be discussed in FIG. 10, at least. The first side 110 may also be referred to as a first end of the thermal chamber 100. The second side 112 may also be referred to as a second end of the thermal chamber 100.

The thermal chamber 100 may be formed from any material, such as a corrugated material. A corrugated material is a structure made of one or more layers that includes a wavy (or ridged or other offsetting structure) layer sandwiched between flat layers. The wavy layer is called the corrugation or fluting. A corrugated material is leveraged, in an example, for its insulative properties for the thermal energy experienced in the thermal chamber 100. A corrugated material provides an advantage of thermally insulating the interior volume of the thermal chamber 100 from exterior conditions and surfaces, which drives efficiency and safety. The corrugated material may be a polymer composition in an example. The corrugated material may be a cardboard or other organic composition (e.g., fiberboard) in another example.

A thermal chamber 100 forms an enclosure capable of containing a portion of a shaft having a sheath thereon and for directing or containing thermal energy. For example, the enclosure may be a vessel capable of containing a fluid, such as water or oil, into which a shaft having a sheath is submerged to apply the thermal energy. The enclosure may be a chest for applying vapor steam to a shaft having a sheath thereon. The enclosure may be the thermal chamber 100 depicted in FIGS. 1-8 that is effective for distributing forced air in an intentional manner to achieve a desired shrinkage along a longitudinal length of the shaft while minimizing the introduction of wrinkles and puckers resulting from uneven application of thermal energy to a sheath on a tapered shaft or any shaft.

The thermal chamber 100, in an example contemplated for use with at least a golf club shaft which has a standardized range of sizes, is contemplated to have a longitudinal length between the first side 110 and the second side 112 between 100 cm and 130 cm. This range of longitudinal length allows for a common thermal chamber to be effective for both of a golf club driver and a non-driver, which is generally shorter than a driver.

Further, the thermal chamber 100 is contemplated in this example to have a width between the front 106 and the back 108 between 10 cm and 20 cm. Further, it is contemplated that the thermal chamber 100 has a height between the top 114 and the bottom 116 between 10 cm and 20 cm. This range of width is effective for suitable air distribution while minimizing a volume of air to be heated to an effective temperature to shrink a sheath. Any size is contemplated and may be adjusted based on dimensions of the article to be heated and/or the dimensions of the sheath to be shrunk.

The height and width of the thermal chamber 100 are adjusted based on a number of shafts contemplated to be heated at a common time. For example, if two or more shafts are contemplated to be heated at a common time, the width may expand if multiple shafts are aligned substantially in a common plane. The common plane provides, in this example, a more uniform heat experienced by each of the plurality of shaft when the thermal chamber is situated in a horizontal orientation.

While many examples relate to sizes, shapes, and configurations capable of applying a sheath to a golf club shaft, it is contemplated that the sheath, the shaft, and the thermal chamber provided herein may be scaled to any size, shape, or configuration to be effective for use in connection with other shafts, such as athletic equipment shafts other than golf club shafts. The present disclosure is not intended to limit the scope of the present invention to a specific use condition, but instead the specific examples are provided to offer additional context and understanding of the larger concept captured in the present disclosure.

The top 114 is hingedly coupled with the back 108 allowing the top 114 to be selectively opened to expose an internal volume of the thermal chamber 100, such as the shaft chamber portion 102. This hinged connection may be a living hinge, such as an intentional fold line in the material forming the thermal chamber 100. The hinged connection may be through a piano-style hinge or other mechanical movement mechanisms. The ability to open and close the top 114 allows for the insertion of an athletic shaft, such as a golf club shaft, into the shaft chamber portion 102, closing the top 114 concentrates and maintains forced heated air within the thermal chamber 100 to effectively shrink the sheath around the inserted golf club shaft.

As it is contemplated that forced air may be introduced into the internal volume of the thermal chamber 100, it is also contemplated that the top 114 may benefit from being mechanically secured in the closed configuration during the application of forced air. A higher-pressure region is formed within the thermal chamber 100 during the introduction of forced air. A non-limiting example of a mechanical closure mechanism includes the first securement 130 and/or the second securement 132. The first securement 130 and the second securement 132 are contemplated to be apertures formed through a portion of the thermal chamber 100 structure, such as the first side 110 and the second side 112, respectively. A first pin, such as a golf tee, may be inserted through an aperture formed in a side panel of the top 114 and through the first securement 130. Similarly, it is contemplated that a second pin, such as a second golf tee, may be inserted through a side panel of the top 114 and through the second securement 132. In this example, the top 114 is mechanically secured in the closed configuration through the mechanical interference between the inserted pin(s) and the securement apertures. This mechanical securement resists the top 114 from exposing the internal volume of the thermal chamber 100 to the exterior as a result of pressure formed from the introduction of forced air through the inlet aperture 122.

The first shaft slot 118 is formed in the first side 110 (also referred to as a grip side in some examples involving a golf club shaft) and the second shaft slot 120 is formed in the second side 112. The first side 110 also includes the inlet aperture 122. The positioning of the first shaft slot 118 and the second shaft slot 120 relative to the inlet aperture 122 is intentional. In an aspect, it is desired to have a slot adapted to receive a greater diameter of a grip end of the golf club shaft at the same side as the inlet aperture 122. This is a result of the air flow achieved by the thermal chamber 100 through the coordination of the air distribution panel 124 and the plurality of air distribution apertures 126 creates a hotter initial environment at the second side 112. It is desired, in an example, for the smaller diameter of the golf club shaft to be positioned in the hotter portion of the thermal chamber 100 as the sheath has a greater amount of shrinkage to achieve on the smaller diameter head end of a golf club shaft. As such the second shaft slot 120 is sized with a smaller width than a width of the first shaft slot 118. Stated differently, a slot at an end of the thermal chamber 100 opposite the inlet aperture 122 is configured to receive a tapered shaft portion requiring a greater amount of shrinkage for a sheath than a slot at the opposite end of the tapered shaft. For example, it is contemplated that the first shaft slot 118 has a width that is greater than a width of the second shaft slot 120. Further, it is contemplated that a vertical depth (height) of the first shaft slot 118 is greater than a vertical depth (height) of the second shaft slot 120. The height and width may be adjusted based on an intended shaft to be inserted. In an example, the slot width is within 25% a width/diameter of a shaft to be inserted. This 25% tolerance provides for easy of insertion of the shaft while limiting un-obstructed surface area that allows higher-pressure air to exit the internal volume of the thermal chamber 100 during a heating operation.

The shaft slots, such as the first shaft slot 118 and the second shaft slot 120, are apertures that extend from an exterior to the interior volume of the thermal chamber 100. Stated differently, the first shaft slot 118, also referred to as a first support aperture, extends through the first side 110 into the shaft chamber portion 102. Similarly, the second shaft slot 120, also referred to as a second support aperture, extends through the second side 112 into the shaft chamber portion 102.

The shaft slots extend from an upper edge of the thermal chamber 100 downwardly. This configuration allows a shaft to be inserted into one or more of the shaft slots when the top 114 is in an open configuration. The shaft slots provide vertical and lateral support to a shaft during a heating operation.

The inlet aperture 122 fluidly connects the air distribution chamber portion 104 with an exterior of the thermal chamber. The inlet aperture 122 is configured to receive a forced air stream directly or indirectly. In a direct manner it is contemplated that an end of a traditional hair dryer (e.g., a blow dryer) is positioned in or near the inlet aperture 122 to receive heated forced air from the hair driver. In that example, the air inlet aperture may be a circle having a diameter from 25 mm to 76 mm. Stated differently, the inlet aperture 122 is contemplated to have an area between 12 cm² and 62 cm². The diameter may be flexibly adjusted to accommodate a variety of sizes of input nozzles, such as the working end of a blow dryer.

The air distribution panel 124 serves as a barrier between the shaft chamber portion 102 and the air distribution chamber portion 104. The air distribution panel 124 is comprised of the plurality of air distribution apertures 126 that fluidly connect the shaft chamber portion 102 with the air distribution chamber portion 104.

Figure 10:
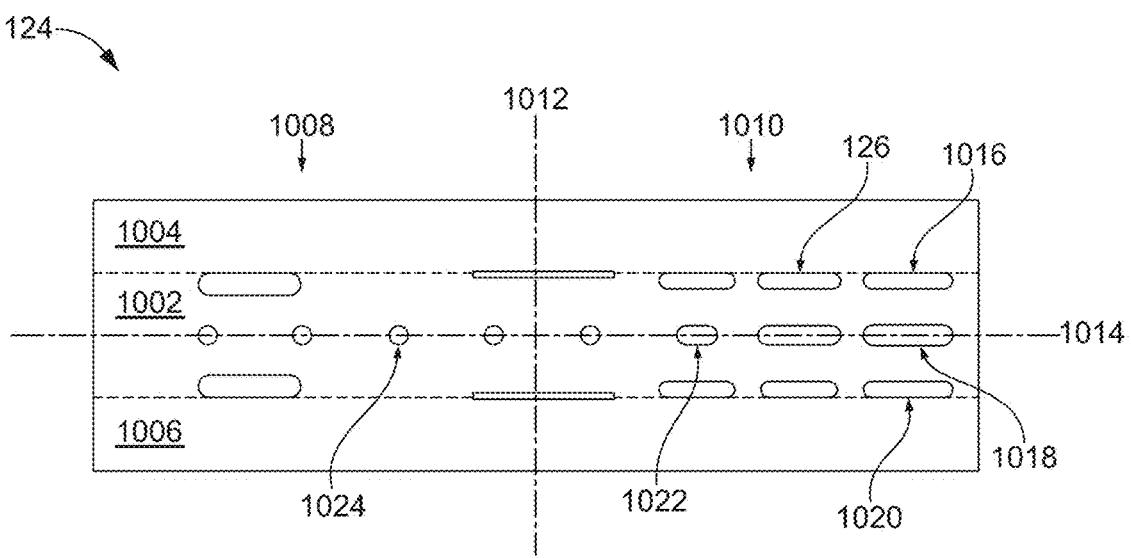
FIG. 10 depicts an air distribution panel dieline illustrating the structures of the air distribution panel of the thermal chamber of FIG. 1 pre-assembly, in accordance with aspects hereof.

Turning briefly to FIG. 10 that depict the air distribution panel 124 in a flattened configuration as a dieline air distribution panel, in accordance with aspects hereof. The air distribution panel 124 is comprised of a central portion 1002, a first wing 1004, and a second wing 1006. As will be depicted in FIGS. 17 and 18, it is contemplated that the first wing 1004 and the second wing 1006 may be fold downwardly to serve a vertical offset supports to define a height of the air distribution chamber portion 104. When the wings are folded, the central portion 1002 forms a dividing panel between the shaft chamber portion 102 and the air distribution chamber portion 104 within the enclosure formed by the thermal chamber 100.

A width midline 1014 is depicted for illustration purposes. A length midline 1012 is depicted for illustration purposes. The width midline 1014 represents an equal division of the central portion 1002 along a width. Stated differently, the midline 1014 provide a center depiction of an internal volume width of the thermal chamber 100. The length midline 1012 represents an equal division of the central portion 1002 along a length. Stated differently, the midline 1012 provide a center depiction of an internal volume length of the thermal chamber 100.

The central portion 1002 is comprised of the plurality of air distribution apertures 126. The plurality of air distribution apertures 126 comprise a central aperture 1018, a first side aperture 1016 and a second side aperture 1018, wherein the central aperture 1018 extends through the midline 1014, the first side aperture 1016 is on a first side of the midline 1014 and the second side aperture 1018 is on a second side of the midline 1014. Various configurations of the apertures are contemplated. For example, along the midline 1014 is the central aperture 1018 having a first surface area, a second central aperture 1022 having a second surface area, and a third central aperture 1024 having a third surface area. The surface area is measured from a plan view (e.g., looking down on a planar surface, such as depicted in FIG. 10).

It is contemplated that the plurality of apertures 126 have a greater collective surface area on a first side of the midline 1012 than the plurality of aperture 126 have a collective surface area on an opposite second side of the midline 1012. For example, in FIG. 10 a side of the midline 1012 (a first side) having the first side aperture 1016, the central aperture 1018, and the second side aperture 1020 have a greater collective (e.g., summation) surface area forming the apertures than the plurality of apertures 126, such as fourth aperture 1024, on the second side of the midline 1012. Stated differently, in air distribution panel 124 has a first plurality of apertures on a first half of a longitudinal length of the air distribution panel and a second plurality of apertures on a second half of the longitudinal length of the air distribution panel, wherein the first plurality of apertures have a first area of aperture and the second plurality of apertures have a second area of apertures, the first area of apertures is greater than the second area of apertures. Otherwise stated, the air distribution panel 124 is contemplated to have a non-symmetrical aperture pattern on a first side of the midline 1012 than from the second side of the midline 1012.

This dissimilar arrangement of apertures provides for a controlled airflow and controlled thermal distribution within the volume of the thermal chamber 100. A temperature within the thermal chamber 100 proximate a higher area of apertures is higher than a temperature measured within the thermal chamber 100 proximate a lower area of apertures. This temperature differential can be 2 to 10 degrees Celsius in some examples. This temperature differential has been found beneficial in the effective shrinking of a heat-shrink sheath on a non-uniform shaft. Specifically, a tapered golf shaft requires a greater degree of shrinking proximate the club end (e.g., a head end or proximate a ferrule) because it has a smaller diameter than the golf shaft proximate the grip (e.g., the butt end). When the sheath starts with a uniform circumference and must shrink a variable amount based on the underlying shaft geometry, the ability to non-uniformly, but in a controlled manner, heat the volume in which the heat-shrink sheath is shrunk provides a defect-free final sheath application. Stated differently, the ability to accelerate a thermal response by a heat-shrink sheath by applying higher heat in targeted areas allows the sheath to uniformly form to the underlying shaft without introducing bubbles, wrinkles, puckering, or another non-laminar conformance by the sheath.

The non-uniform distribution of the plurality of apertures 126 are arranged, in an example, with the smaller collective surface area of apertures are closer to the inlet aperture 122 than the second plurality of apertures having the greater collective surface area of apertures. This distribution of the non-uniform apertures where there are more vent area being further away from the inlet aperture 122 enhances the intended air flow and distribution to achieve a uniform shrink result by inducing a non-uniform temperature gradient across a length of the thermal chamber 100. Stated differently; by placing the greater number of vents further from the source of the heat and pressurized air source, the heated and pressurized air has an opportunity to flow and moderate the hot air stream to provide consistent air flow and thermal energy application for a consistent sheath shrink result.

The variable sizes and shapes between the plurality of aperture 126 further enhances the control of air flow and thermal energy distribution. For example, the circular form of the fifth aperture 1024 in closer proximity to the inlet aperture 122 as compared to the larger ovular form of the second aperture 1018 facilitates a consistent result of the heat-shrink sheath. Similarly, the increasing gradient of surface area as there is a progression from the fifth aperture 1024 to the fourth aperture 1022 and to the second aperture 1018 along the midline 1014 as they extend away from the inlet aperture 122 is intentional to achieve a controlled airflow and distribution that provides a consistent result with the heat-shrink wrap.

Positioning of the apertures relative to the midline 1014 is also intentional in an example. As is depicted in the figures, an axis extending between the support slots (e.g., first shaft slot 118 and second shaft slot 120) aligns with the midline 1014. It is intended, in an example, to have at least one aperture intersected by the axis in which a shaft will be supported. In this example, the midline 1014 represents the axis extending between the support slots that are intended to support a shaft. This allows for a direct venting of heated air to flow through the air distribution panel 124 from the air distribution chamber portion 104 to the shaft chamber portion 102 where the vented hot air stream intersects the heat-shrink sheath. This direct application of hot air to the sheath, in an example, facilitates achieving a defect-free sheath shrink.

The viewing window 128 provides a transparent surface through which a user may view the internal volume formed by the enclosure of the thermal chamber 100. The viewing window 128 adds a layer of transparency and control to the application process, making the process more interactive and ensuring a professional-grade finish. The viewing window 128 may be made from a variety of materials, such as polycarbonate, PETG, acrylic, glass, and other materials. In an example the viewing window 128 is formed from polycarbonate. In this example the polycarbonate is at a thickness of 20-50 mil. Polycarbonate provides sufficient heat insulation, durability, and transparency for use in the thermal chamber 100 as contemplated.

The position of the viewing window 128, in an example, is also intentional. Placing the viewing window 128 such that it has visibility to a reference axis extending between support slots ensures that the shaft, when being heated, is viewable to a user to inspect the heating process. Further, it is contemplated that the viewing window is at least on a side opposite from the inlet aperture 122. In this example, the greatest intended shrink expected from a sheath is positioned opposite the inlet aperture 122 and therefore the most visual monitoring is provided for that portion of the shaft. In the example of a golf club, the ferrule end having the club head (or end that is intended to have the club head) is proximate the second side 112. The smallest diameter portion of a golf club shaft is therefore contemplated as being placed proximate the second side 112. This allows the user, in this example, to visually inspect the shrink process proximate the ferrule on the golf club shaft, which is where a higher degree of shrink must be achieved.

Figure 9:
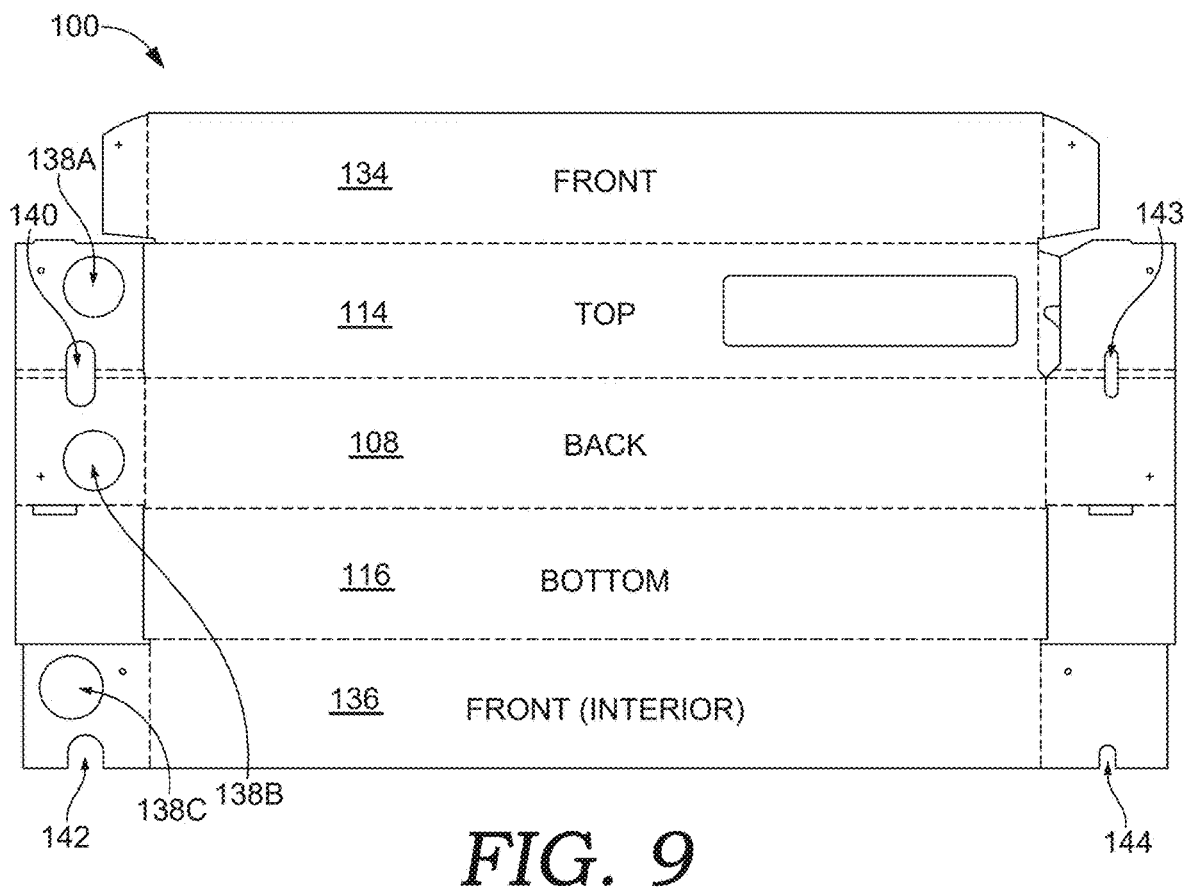
FIG. 9 depicts a thermal chamber dieline illustrating the structures of the thermal chamber of FIG. 1 pre-assembly, in accordance with aspects hereof.

FIGS. 9-23 depict an assembly process for forming the thermal chamber 100, in accordance with aspects hereof. FIG. 9 depicts a dieline of the thermal chamber in a planar (unfolded) configuration. A dieline is a mapping of panels, folds, apertures, and the like that will form into the thermal chamber 100. The dieline illustrates a number of features, that when folded or assembled, form features of the thermal chamber 100. For example, a series of holes (aka apertures) 138A, 138B, and 138C are positioned such that during the folding operation they converge to form the inlet aperture 122. Similarly, an aperture 140 and a slot 142 converge during the assembly process to form the first shaft slot 118. Also similarly, an aperture 143 and a slot 144 converge during the assembly process to form the second shaft slot 120. A number of panels form the dieline that ultimately is formed into the thermal chamber 100. Those panels include a front panel 134 that will form an exterior panel of the front 106, the top 114, the back 108, the bottom 116, and a front panel 136 that will form an interior panel of the front 106. Each (or some) of the panels are contemplated to include a first wing and/or a second wing. When present, the first wing and the second wing may form a portion of the respective first side 110 and the second side 112. The manipulation of the panels and associated wings will be depicted in the following figures to form the enclosure of the thermal chamber 100.

Figure 11:
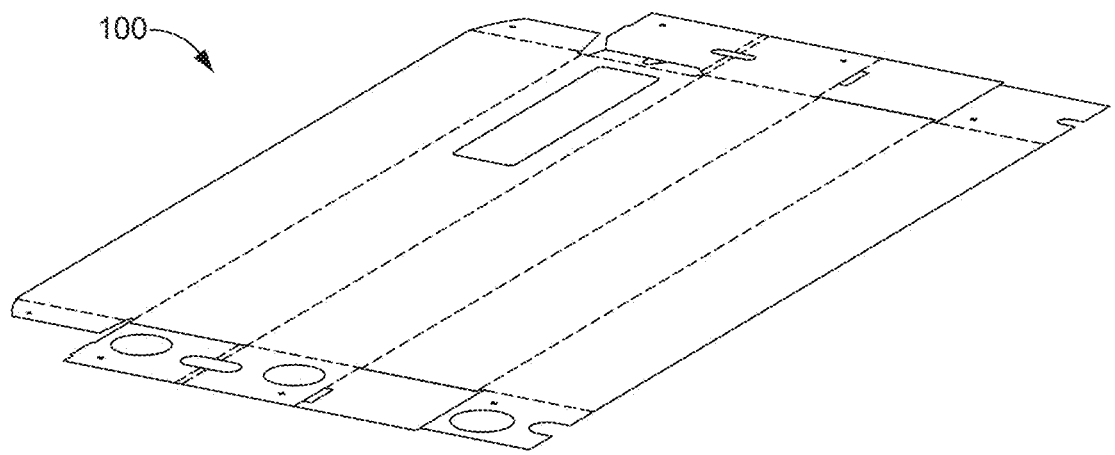
FIG. 11 depicts a perspective view of the thermal chamber dieline of FIG. 9, in accordance with aspects hereof.
Figure 12:
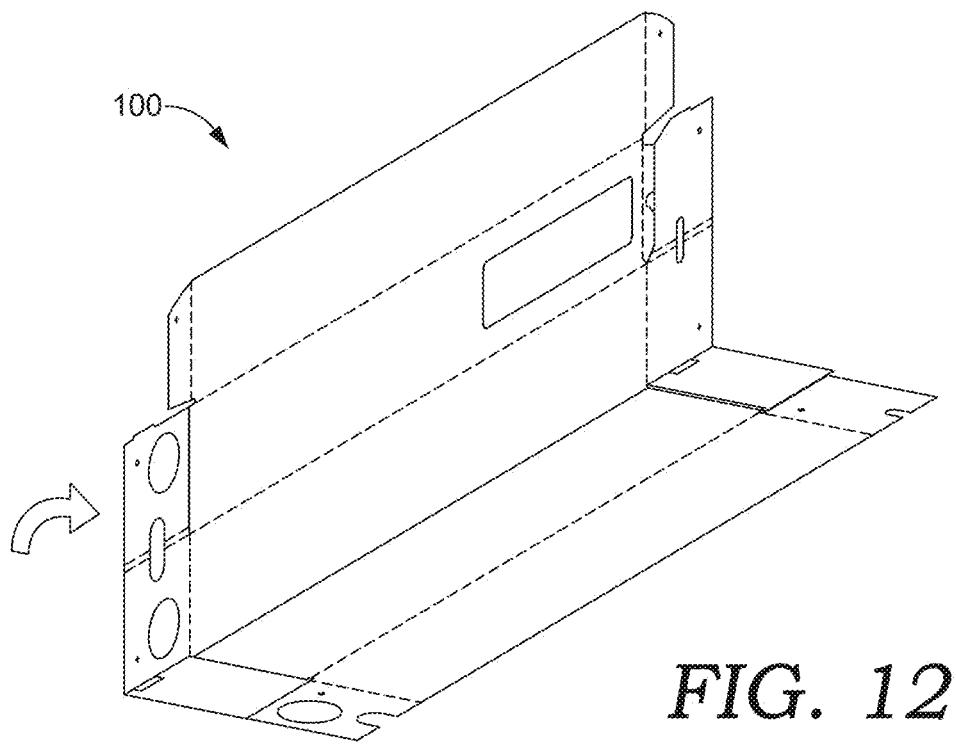
FIG. 12 depicts a step in the folding operation of the thermal chamber dieline, in accordance with aspects hereof.
Figure 13:
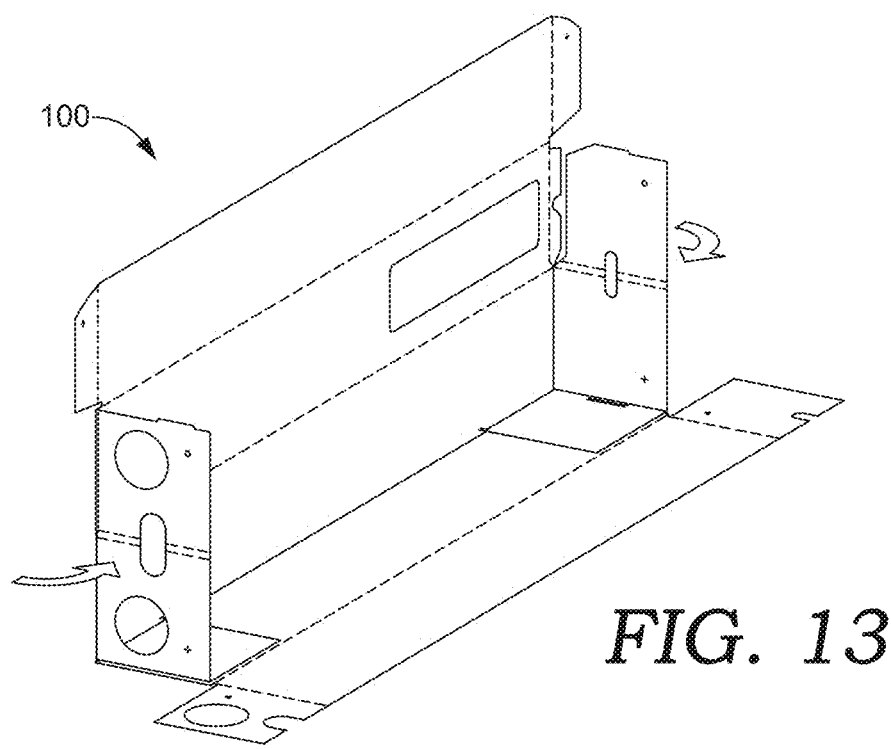
FIG. 13 depicts a second step in the folding operation of the thermal chamber dieline, in accordance with aspects hereof.

FIG. 11 depicts a perspective view of the thermal chamber dieline of FIG. 9 that forms the thermal chamber 100, in accordance with aspects hereof. A non-limiting sequence of assembly steps will be depicted extending from FIG. 11 through FIG. 23. It is appreciated that variations in the sequence may be practiced achieving the formed thermal chamber 100 enclosure. Further, while a specific dieline is provided, it is appreciated that variations in size, location, and shape may be also executed. FIG. 12 depicts a first step in the folding operation of the thermal chamber dieline, in accordance with aspects hereof. Specifically, the back 108 and the bottom 116 are folded in a transverse relationship. FIG. 13 depicts a second step in the folding operation of the thermal chamber dieline, in accordance with aspects hereof. Specifically, a first wing and a second wing from the back 108 and the top 114 are folded to forma portion of the first side and the second side, respectively. Additionally, a first wing and a second wing of the bottom 116 are folded parallel with the bottom 116.

Figure 14:
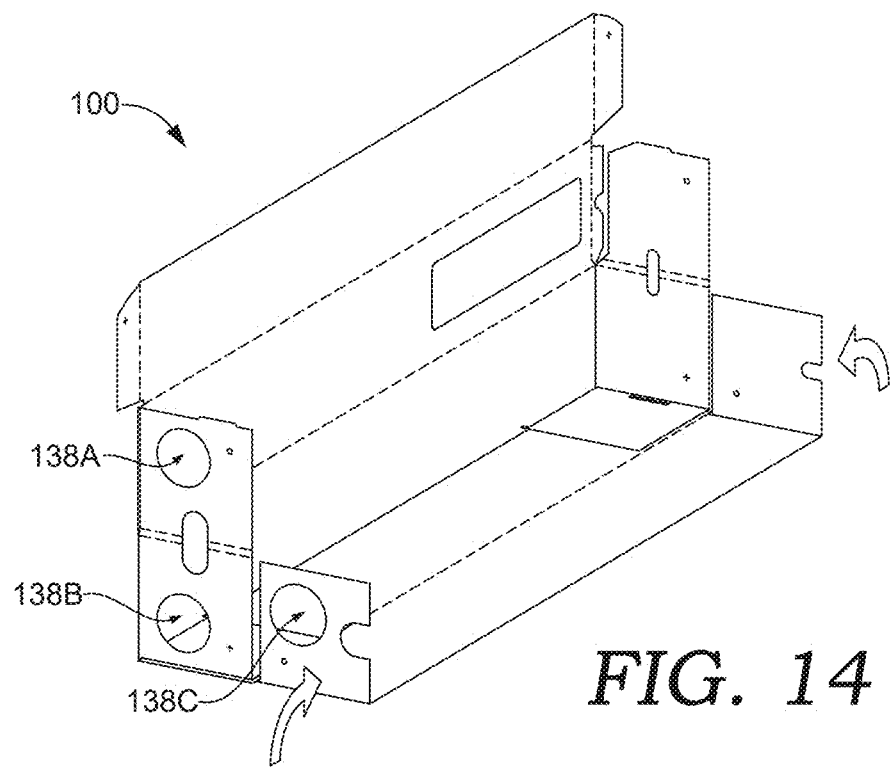
FIG. 14 depicts a third step in the folding operation of the thermal chamber dieline, in accordance with aspects hereof.
Figure 15:
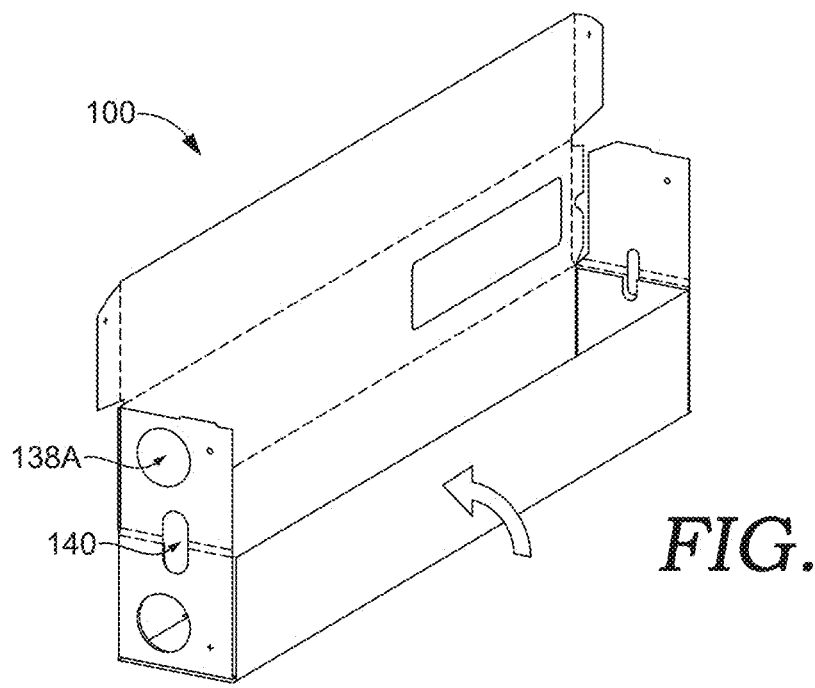
FIG. 15 depicts a fourth step in the folding operation of the thermal chamber dieline, in accordance with aspects hereof.
Figure 16:
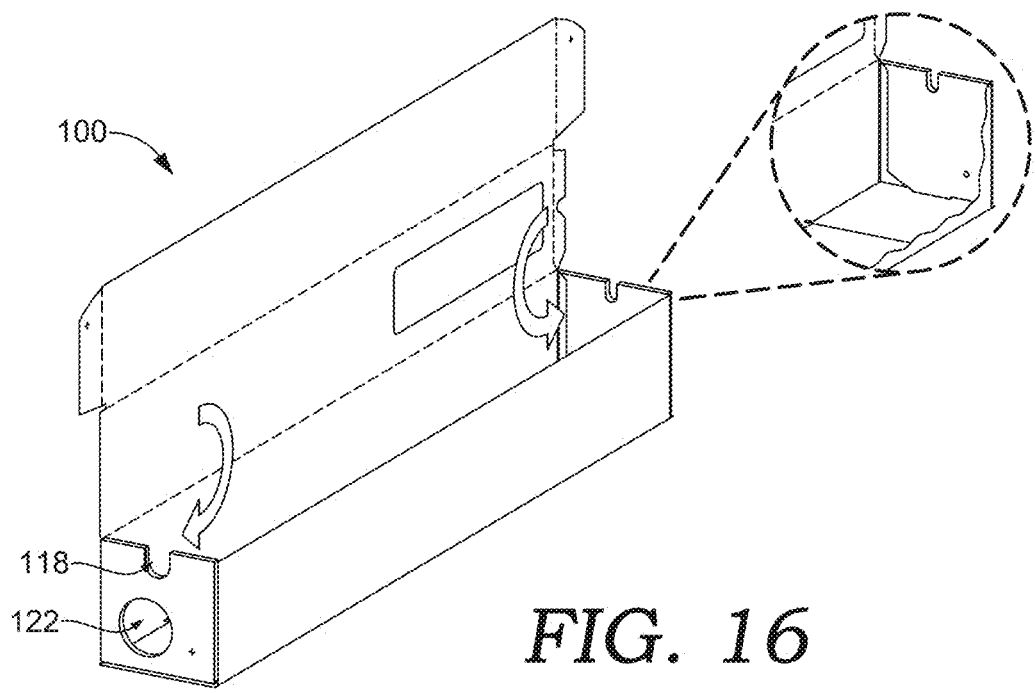
FIG. 16 depicts a fifth step in the folding operation of the thermal chamber dieline, in accordance with aspects hereof.

FIG. 14 depicts a third step in the folding operation of the thermal chamber dieline, in accordance with aspects hereof. Specifically, a first wing and a second wing are folded transverse to the front panel 136 to form a portion of the first side and the second side, respectively. FIG. 15 depicts a fourth step in the folding operation of the thermal chamber dieline, in accordance with aspects hereof. Specifically, the front panel 136 and associated wings are folded transverse to the bottom 116. This forms an interior portion of the front 106. FIG. 16 depicts a fifth step in the folding operation of the thermal chamber dieline, in accordance with aspects hereof. In this fifth step, the first wing and the second wing aligned with the top 114 in the dieline form are folded to be substantially parallel with the first and second wings of the back 108 and the front panel 136. This aligns the series of holes 138A, 138B, and 138C to form the inlet aperture 122. It is noted that in this example, a tab of the first wing and second wing associated with the top 114 insert into slots formed in the first wing and second wing associated with the bottom 116 to secure the first side 110 combination of wings and the second side 112 combination of wings, as depicted in the expanded view portion of FIG. 16.

Figure 17:
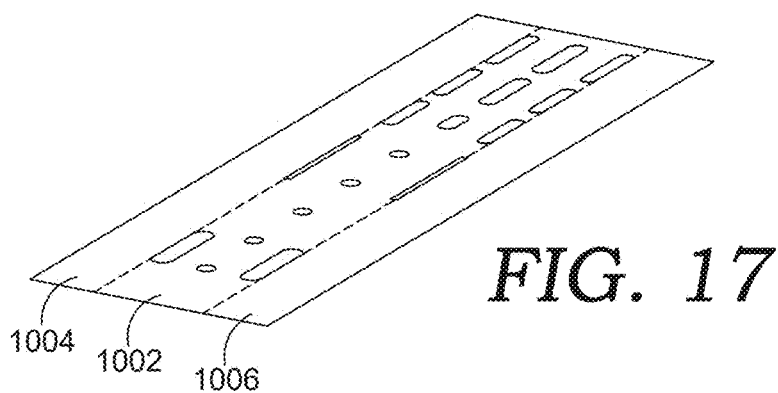
FIG. 17 depicts a perspective view of the air distribution panel dieline of FIG. 10, in accordance with aspects hereof.
Figure 18:
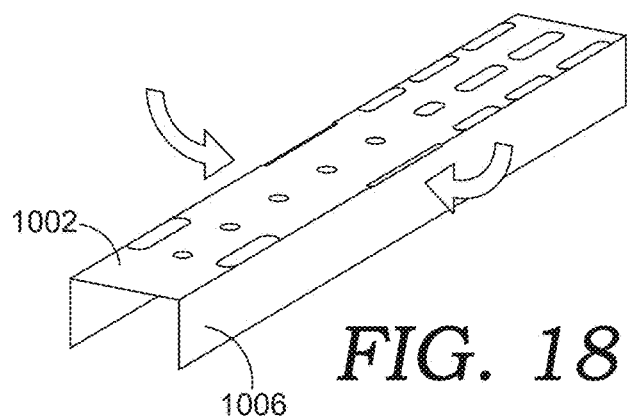
FIG. 18 depicts a step in the folding operation of the air distribution panel dieline, in accordance with aspects hereof.

FIG. 17 depicts a perspective view of the air distribution panel 124 dieline of FIG. 10, in accordance with aspects hereof. FIG. 18 depicts a step in the folding operation of the air distribution panel 124 dieline, in accordance with aspects hereof. Specifically, the first wing 1004 and the second wing 1006 are each folded transverse to the central portion 1002. In this manner, the first wing 1004 and the second wing 1006 form legs to support the central portion 1002 an offset distance above the bottom 116 when assembled in the thermal chamber 100. This offset distance defines a height of the air distribution chamber portion 104 that is located below the central portion 1002 of the thermal chamber 100 enclosure. It is noted that the offset distance between the central portion 1002 and the bottom 116 is, in an example, at least a diameter (or heigh measurement) of the inlet aperture 122. This correlation ensure that the central portion 1002 is effective to adjust and manipulate the airflow within the enclosure of the thermal chamber 100.

Figure 19:
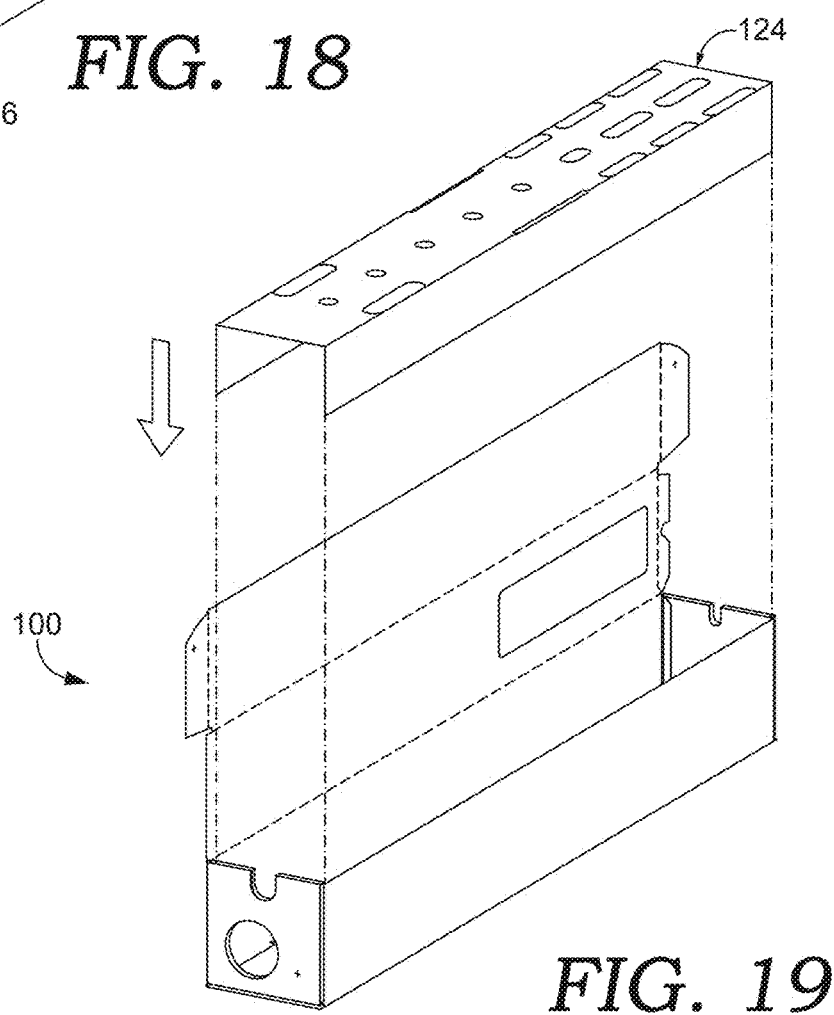
FIG. 19 depicts an assembly step of inserting the folded air distribution panel dieline into the partially folded thermal chamber dieline, in accordance with aspects hereof.
Figure 20:
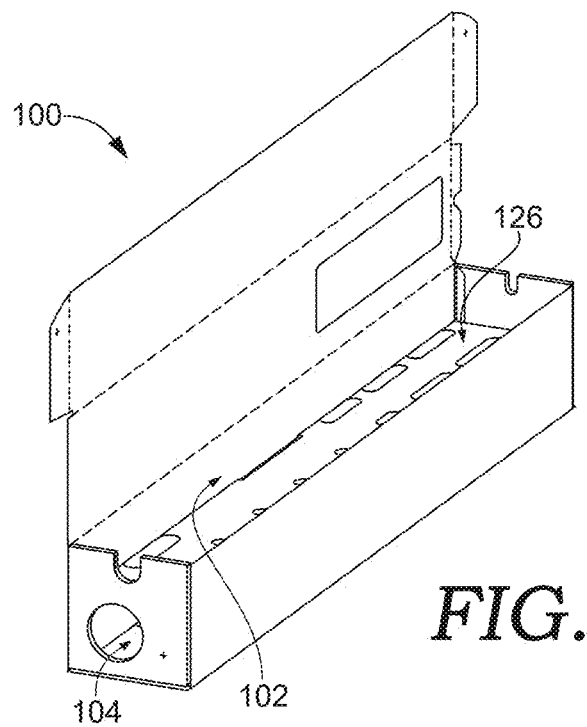
FIG. 20 depicts the folded air distribution panel dieline in the partially folded thermal chamber dieline, in accordance with aspects hereof.
Figure 21:
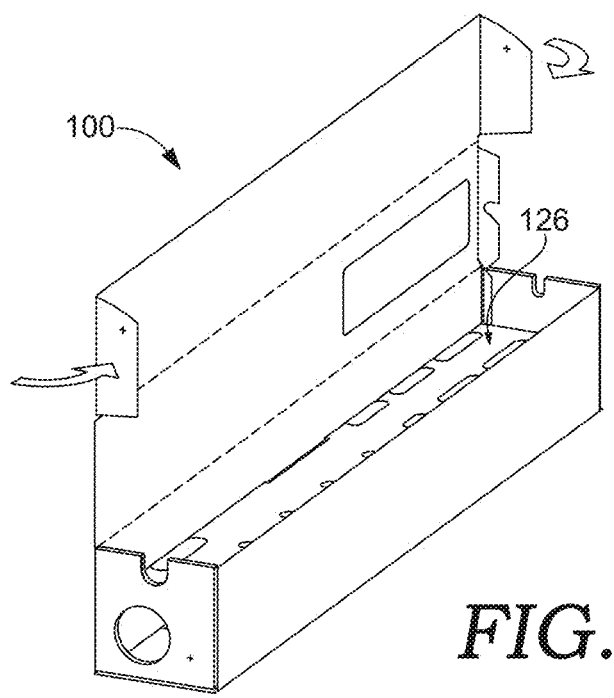
FIG. 21 depicts a sixth step in the folding operation of the thermal chamber dieline, in accordance with aspects hereof.

FIG. 19 depicts an assembly step of inserting the folded air distribution panel 124 dieline into the partially folded thermal chamber 100 dieline, in accordance with aspects hereof. As seen in FIG. 19, the air distribution chamber portion 104 is formed below the central portion 1002 and the shaft chamber portion 102 is created above the central portion 1002, as is also seen in FIG. 20. FIG. 20 depicts the folded air distribution panel 124 dieline in the partially folded thermal chamber 100 dieline, in accordance with aspects hereof. As is depicted herein, the plurality of apertures 126 form an air circulation structure through the air distribution panel 124. FIG. 21 depicts a sixth step in the folding operation of the thermal chamber dieline, in accordance with aspects hereof. Specifically, the first and second wings of the front panel 134 are folded inwardly to form, in part, securement elements to maintain the thermal chamber 100 in a closed condition with positive pressure air introduced within the internal volume thereof. As is also depicted, a wing from the top is folded inwardly as well. This wing has a partial slot that is intended to align with the second shaft slot 120 as formed from the aperture 143 and the slot 144. The partial slot assists in the effective used of the thermal chamber 100 by limiting air flow out of the second shaft slot 120. The partial slot conforms, in some examples, to an inserted shaft to partially seal the second shaft slot 120. This partial slot may shield a terminal end, such as a golf club head, from the higher temperature air under pressure within the thermal chamber 100. The shielding limits exposure to elements of the shaft, such as adhesive, ferrules, club heads, and the like that may be more sensitive to elevated temperatures than the shaft itself. Therefore, the wing depicted from the top 114 provides an advantage in some examples. A separate shield has also been contemplated that is placed proximate to either of the shaft slots.

Figure 22:
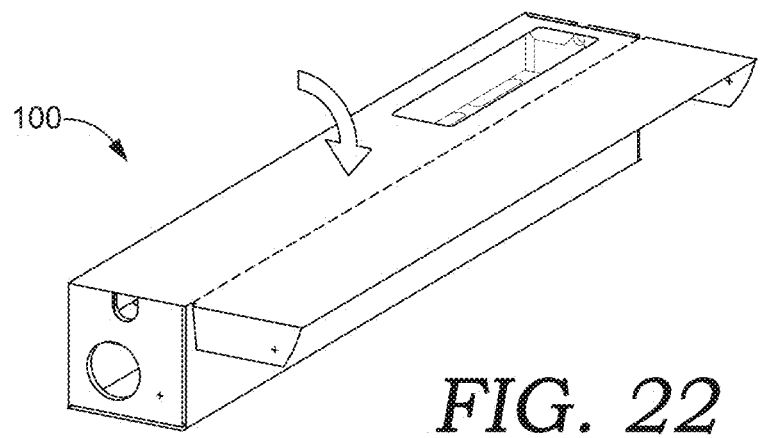
FIG. 22 depicts a seventh step in the folding operation of the thermal chamber dieline that closes the top, in accordance with aspects hereof.
Figure 23:
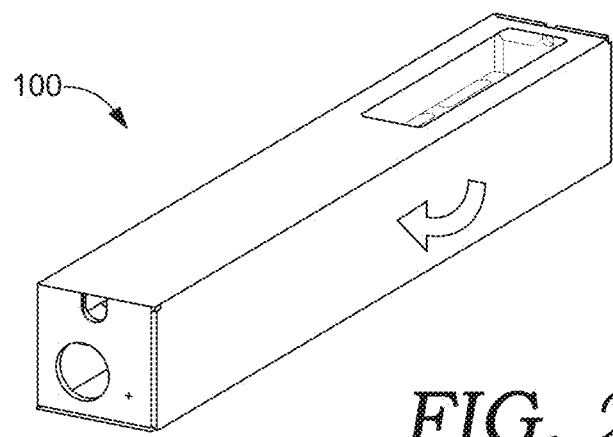
FIG. 23 depicts an eighth step in the folding operation of the thermal chamber dieline that represent securing the top, in accordance with aspects hereof.

FIG. 22 depicts a seventh step in the folding operation of the thermal chamber 100 dieline that closes the top, in accordance with aspects hereof. FIG. 23 depicts an eighth step in the folding operation of the thermal chamber 100 dieline that represent securing the top, in accordance with aspects hereof. The steps of FIGS. 22 and 23 represent a closing and securing operation of the enclosure formed by the thermal chamber 100. Specially, the top 114 is lowered to enclose the volume within the thermal chamber 100 in FIG. 22 and the front panel 134 is aligned with the front panel 136 with respective first and second wings inserted between the first side 110, the second side 112, and the front panel 136, respectively. The insertion of the first and second wings assists in securing the thermal chamber 100 in a closed manner even with subsequent application of positive pressure air through the inlet aperture 122. Additional securement is contemplated by the insertion of a pin, such as a golf tee, through the first securement 130 and/or the second securement 132.

Methods of Use

Figure 24:
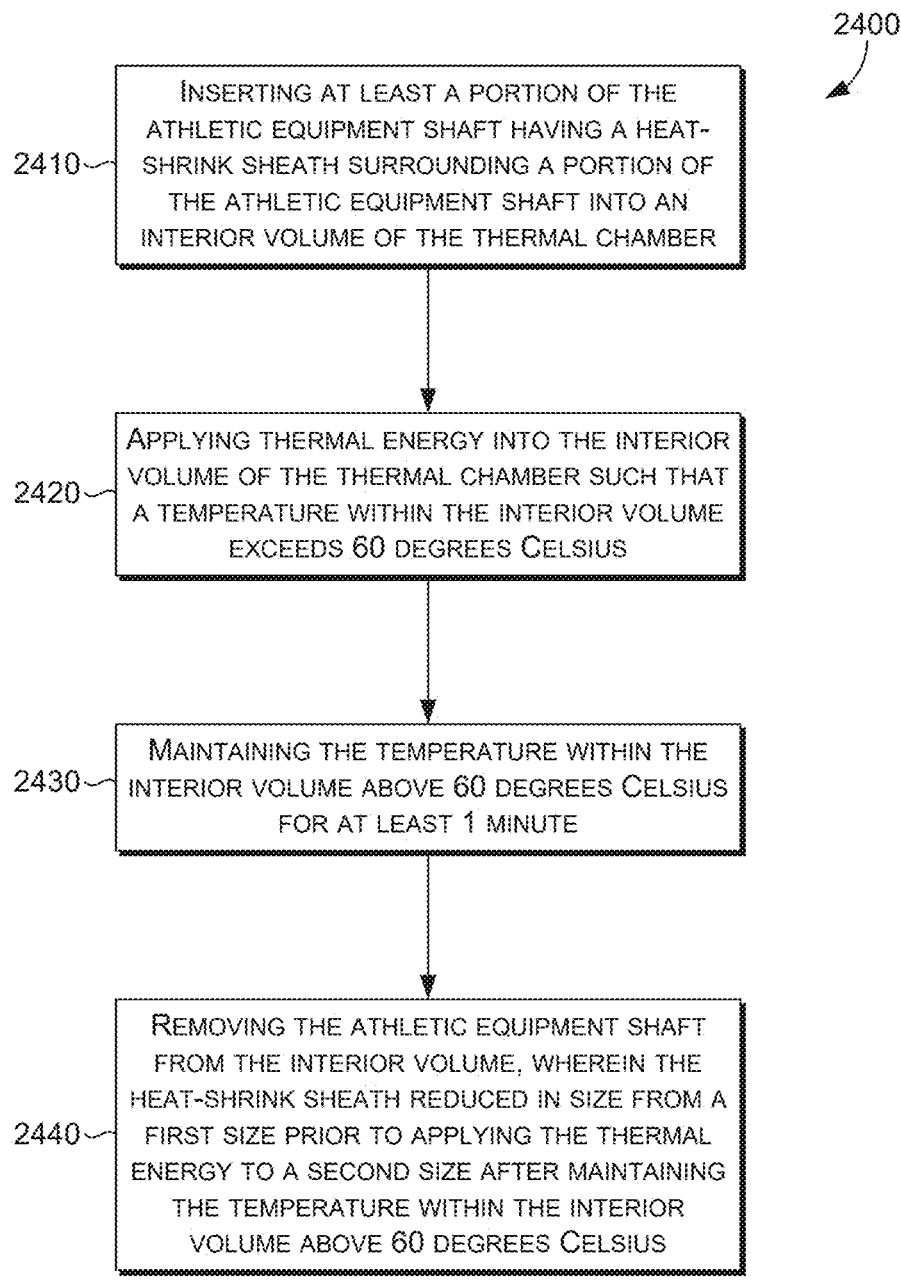
FIG. 24 depicts a flow chart of a method for using the thermal chamber.

FIG. 24 is a flowchart of an example method of using a thermal chamber, such as the thermal chamber 100, for heat shrinking a sheath on an athletic equipment shaft. The method includes at step 2410, inserting at least a portion of the athletic equipment shaft having a heat-shrink sheath surrounding a portion of the athletic equipment shaft into an interior volume of the thermal chamber. The interior volume includes a shaft chamber portion 102.

At step 2420, the method includes applying thermal energy into the interior volume of the thermal chamber such that a temperature within the interior volume exceeds 60 degrees C. As will be discussed in more detail hereinafter, the heat-shrink material forming the sheath contracts under specified conditions, such as an activation temperature exceeding 60 degrees C., in an example. Other temperature and time ranges contemplated include the application of thermal energy contemplates applying the thermal energy for 30 second to four minutes when the thermal energy is measured as air temperature above 65 degrees C. In another example, it is contemplated that applying the thermal energy for 30 second to 2 minutes when the thermal energy is measured as air temperature above 75 degrees C. In another example, it is contemplated that applying the thermal energy for 30 second to 90 seconds when the thermal energy is measured as air temperature above 80 degrees C. In another example, it is contemplated that applying the thermal energy for 15 second to 4 minutes when the thermal energy is measured as air temperature between 70 degrees C. and 100 degrees C. In another example, it is contemplated that applying the thermal energy when the thermal energy is measured as air temperature between 80 degrees C. and 95 degrees C.

At step 2430, the method includes maintaining the temperature within the interior volume above 60 degrees Celsius for at least 1 minute. As provided above, sufficient contraction of the heat-shrink material to successfully wrap an athletic shaft includes exposing the material (e.g., sheath) to a temperature above 60 degrees C. for at least a minute.

At step 2440, the method includes removing the athletic equipment shaft from the interior volume, wherein the heat-shrink sheath reduced in size from a first size prior to applying the thermal energy to a second size after maintaining the temperature within the interior volume above 60 degrees Celsius. In this method step, the sheath is shrinking from the as-applied size to shaft conformance size.

From a broader perspective of preparing an athletic shaft for application of a heat-shrink sheath in a thermal chamber the following is a contemplated method of applying a heat-shrink sheath to an athletic equipment shaft. At a first step a shaft, such as an athletic equipment shaft, is inserted into a sheath, such as the sheath provided herein. The insertion of the shaft into the sheath may occur such that the shaft has an additional component (e.g., a grip) attached thereto and the additional component passes through the sheath as part of the insertion. The insertion may be accomplished by pulling or otherwise positioning the sheath over the shaft.

The method continues where thermal energy is applied to the sheath surrounding the shaft within the thermal chamber 100. The thermal energy applied is above 65 degrees C. In an example, the thermal energy applied is an air stream generated by a fan passing air over/through a thermal generator. A thermal generator may be an electrically resistive element, such as a heating coil or a heating strip. The thermal generator may rely on conduction, convection, or other thermal principals to elevate the temperature of objects/air from ambient conditions. In an example a traditional hair dryer is an example of a device effective for applying thermal energy to the sheath surrounding a shaft. Infrared heating is also contemplated. Steam heating is contemplated.

The application of thermal energy contemplated applying the thermal energy for 30 second to four minutes when the thermal energy is measured as air temperature above 60 degrees C. In another example, it is contemplated that applying the thermal energy for 30 second to 2 minutes when the thermal energy is measured as air temperature above 75 degrees C. In another example, it is contemplated that applying the thermal energy for 30 second to 90 seconds when the thermal energy is measured as air temperature above 80 degrees C. In another example, it is contemplated that applying the thermal energy for 15 second to 4 minutes when the thermal energy is measured as air temperature between 70 degrees C. and 120 degrees C. In another example, it is contemplated that applying the thermal energy when the thermal energy is measured as air temperature between 80 degrees C. and 110 degrees C.

Further yet, it is contemplated that a gradient temperature is leveraged to enhance a quality of the final sheath wrapping a shaft. For example, raising the air temperature surrounding the sheath that is wrapping a shaft over time assists in minimizing wrinkles and puckering that can occur with flash shrinking caused by an immersion of the sheath in an environment where the air temperature exceed 85 degrees C.

This flash shrinking can cause non-uniform shrinking over time causing the sheath to wrinkle, rotate, and/or shift. Avoidance of these concerns can be achieved, in an example, with raising the temperature from 65 degrees C. to above 70 degrees C. over at least 30 seconds. This temperature rise of air surrounding the sheath allows the sheath to more uniformly shrink along a longitudinal length and minimizes unintended blemishes in the shrunk sheath.

In addition to applying thermal energy by way of surrounding air having an elevated temperature, it is contemplated that wet steam, water, and/or other fluids may be applied as a stream, baths, and the like to cause the sheath to shrink while on a shaft. Excessive moisture, in some examples, may become trapped between the sheath and the shaft and adversely affect the shaft. For example, if the shaft is formed from metal susceptible to corrosion, trapped moisture may induce a corrosive result on the shaft. Therefore, moisture bearing thermal delivery means should be approached cautiously in situations where the shaft may be adversely impacted by prolonged exposure to moisture.

An additional method contemplated for applying a heat-shrink sheath to a golf club is now provided. At a first step a grip on a golf club shaft is rolled up a first distance. The golf club grip can roll onto itself to expose a portion of the underlying golf club shaft traditional covered by the grip. The rolling process may be accomplished by engaging an inferior edge of the grip on the shaft and rolling the inferior edge over a superior portion of the grip to cause a rolling or overlapping of the grip proximate the inferior edge on a superior portion of the grip. Regardless of how the grip is turned back, a portion of the shaft traditionally covered by an inferior portion of the grip is now exposed and will serve as a termination location for the sheath following shrinking.

At a next step of this method a golf club shaft is inserted into the sheath, such as the sheath contemplated herein. The insertion of the shaft into the sheath may be accomplished by passing the sheath over the grip, passing the sheath over the grip end of the shaft after removing of the grip provided in the last step, or passing the sheath over the head end of the shaft after the removal of the golf club head (e.g., a driver head removable connected to a head end of the shaft).

At a next step, the sheath is optionally spaced away in the longitudinal direction from a ferrule (or the position where a ferrule should be located) on the golf club shaft. The spacing may be accomplished with a physical spacer block or gauge that ensures a consistent offset is achieved. The offset may be 0.1 mm to 15 mm from the position the head, the ferule, or the location for a ferrule to be placed. This 0.1-15 mm offset exposes the shaft at the narrowest portion of the shaft to be covered by the sheath. This is purposeful in this example as the sheath may expand in the longitudinal direction because of the significant constriction in the transverse direction at the head end of the shaft that requires the greatest amount of shrinkage along the shaft length. The offset provides a tolerance for the sheath to expand longitudinally without puckering or otherwise deforming from a collision with the ferrule or golf head. As will be discussed at a block 1418, a termination tape may be optionally applied to secure the sheath end closest to the ferrule and the cover, for protection of the underlying shaft, any remaining exposed shaft portion following the thermal energy application to the sheath. Stated differently, in an example the sheath does not extend over the ferrule or club head. However, in other examples, it is contemplated that the sheath extends over the ferrule and then a cut is made to the sheath following shrinkage to size the sheath longitudinally.

At a next step, the sheath is temporary secured to the shaft. This temporary securement may include a removable tape or sticker positioned on the sheath and an exposed portion of the shaft. The temporary securement may be from a placement tape. The temporary securement may be positioned near the grip end of the shaft at the transition from the sheath to the exposed shaft. The temporary securement may additionally or alternatively be positioned near the head end of the shaft at the transition from the sheath to the exposed shaft, ferrule, or head. The temporary securement is effective to maintain a position of the sheath along a longitudinal length of the shaft to maintain the offset from block provided in the last step. The temporary securement is effective to maintain a rotational position of the sheath relative to the shaft. For example, the joint/seam and/or longitudinal perforation may be positioned on a backside hemisphere of the shaft and the temporary securement ensures the sheath does not material rotate relative to the shaft prior to shrinking into position.

In an example where forced air is leveraged to apply thermal energy, the temporary securement of the sheath to the shaft limits the movement of the sheath introduced by the passing of the forced air over the yet-to-be shrunk sheath. Further, it is contemplated that the temporary securement is positioned on the sheath and shaft at the grip end when the grip end is more proximate the source of the forced air relative to the head end. Further, the placement tape is effective to position and maintain the sheath at a longitudinal position (e.g., proximate the ferrule) during a shrinking operation.

At a next step, at least a portion of the shaft having the sheath thereon is positioned in a thermal chamber. In an example, the thermal chamber is comprised of a shaft chamber having a first support element, such as a first shaft slot, and a second support element, such as a second shaft slot, which are effective to suspend the portion of the shaft having the sheath thereon within the chamber. In this example, the grip may be positioned outside of the thermal chamber and the golf club head may be positioned outside of the thermal chamber. Having the grip and head outside of the thermal chamber reduces exposure of those components to the thermal energy being applied to the sheath. By limiting the exposure of the grip and head, the shrinking of the sheath to the shaft limits the effects of thermal energy on those components (e.g., softening an adhesive used in connection with the grip and/or golf club head or ferrule). The shaft may be positioned in the chamber with the joint and/or longitudinal perforation upward facing (e.g., on the sheet). The positioning of the joint and/or longitudinal perforation in the upward facing position allows for easy inspection of those feature before, during, and after the application of thermal energy.

At a further step, thermal energy is applied to the thermal chamber 100. Thermal energy application increases the ambient temperature to which the sheath is exposed within the thermal chamber. This may be accomplished through the introduction of forced air passing over a heating element, such as a stream of hot air emanating from a traditional hair dryer. As provided above, the application of thermal energy contemplates applying the thermal energy for 30 second to four minutes when the thermal energy is measured as air temperature above 65 degrees C. In another example, it is contemplated that applying the thermal energy for 30 second to 2 minutes when the thermal energy is measured as air temperature above 75 degrees C. In another example, it is contemplated that applying the thermal energy for 30 second to 90 seconds when the thermal energy is measured as air temperature above 80 degrees C. In another example, it is contemplated that applying the thermal energy for 15 second to 4 minutes when the thermal energy is measured as air temperature between 70 degrees C. and 100 degrees C. In another example, it is contemplated that applying the thermal energy when the thermal energy is measured as air temperature between 80 degrees C. and 95 degrees C.

In yet a different example, the thermal chamber is a fluid bath in which there is a fluid that is above 65 degrees C., or above 75 degrees C., or above 80 degrees C., or above 85 degrees C., or above 90 degrees C. The fluid may be water, oil, or other mediums acceptable for the applying sufficient thermal energy to the sheath to cause a shrinking effect effective to compress the sheath around the shaft.

In yet another example, the thermal chamber is a chamber having a steam port effective for disseminating water vapor steam at the sheath within the chamber. The steam port may be fluidly coupled with a boiler or other generator of water vapor steam.

At a further step, the golf club shaft is removed from the thermal chamber 100. The removal occurs once the sheath has sufficiently constricted around the shaft to form a protective covering with acceptable aesthetics. The removal may occur after the shaft, sheath, or ambient conditions of the thermal chamber have decreased from a temperature experienced during the shrining operation. This intentional delay in removing the shaft from the thermal chamber may allow for other features, such as a thermally activated glue used in connection with a grip, ferrule, and/or golf head to solidify, set, or otherwise transform from a temporary state introduced during the shrinking operation.

It is contemplated that any of steps may be repeated to layer one sheath over another sheath. For example, an initial cycle of steps may be performed with a first sheath, such as a white sheath. Then, following step of applying the initial sheath, the steps may be repeated (less any optional steps omitted) with a second sheath over the first sheath. This dual sheath concept may be used in situations where the second sheath has opaque, transparent, translucent portions that expose portions of the underlying article unintentionally. Therefore, the first sheath may provide a more uniform surface (e.g., a white sheath forms a white surface) onto which the second sheath may be applied. Further, it is contemplated that the first sheath may include elements provided herein (e.g., tactile elements, identifiers, RFID elements, and the like) and the second sheath protects or overlaps those elements applied via the first sheath.

Stated differently, it is contemplated that a first sheath is on an article and a second sheath overlays the first sheath on the article. The article has two or more sheaths, with the second sheath overlaps at least a portion of the first sheath. In an example, it is contemplated that two or more sheaths form a set of sheaths. The set of sheaths may include a first sheath having a first longitudinal length and a first circumference and a second sheath having a second longitudinal length and a second circumference. The first and second longitudinal lengths are different and the first and second circumferences are different. In a specific example, the set of sheaths includes a driver sheath and a non-driver sheath. A driver sheath has a longitudinal length between 850 mm and 950 mm and a circumference between 50 mm and 55 mm and a non-driver sheath has a longitudinal length between 725 mm and 825 mm and a circumference between 90 mm and 100 mm. Other combinations are contemplated, such that the set includes at least two times a number of a second sheath as compared to a first sheath to supply multiple shafts in an athletic equipment set, such as a golf club set.

At a next step, the grip is unrolled or otherwise pealed back to an intended configuration. This action obscured the grip end of the sheath under the grip and provides a clean transition from the protective covering without the use of termination tape at the grip end. The covering of the grip and of the sheath also prevents an unintended activation/tearing of a longitudinal perforation.

At yet another, optional step, a termination tape is applied at a head end of the sheath near the ferrule or the golf club head. While optional, the termination tape accounts for a gap between the sheath and the ferrule/golf head following the shrink operation. Depending on shaft diameter, ambient conditions, material properties of the sheath, a portion of the shaft may remain exposed between the terminal end of the sheath and the ferrule/club head. Application of the termination tape over the exposed shaft portion and inclusion of the sheath in the coverage of the termination tape provides a protective layer to the exposed shaft portion and terminates the sheath to protect the sheath from ripping or otherwise catching. The termination tape may have a width (measured in the longitudinal direction of the shaft when applied) of 1 mm to 10 mm, in an example, the termination tape nay be and size in another example. The termination tape may be applied by wrapping the tape around the shaft and back onto the first applied portion of the termination tape. The termination tape may have an adhesive back effective to bond the termination tape with the exposed shaft portion and the head end of the sheath.

The steps of this method are optional and may be performed in alternative orders from that which they are discussed. Further it is understood that one or more additional steps may be inserted to the method. Further, it is contemplated that one or more steps may be omitted from the method, such as optional steps.

Sheath

A heat-shrink sheath provided herein is contemplated as being used as a protective sheath for a pole, such as a ski pole. In some examples the ski pole is longer than some gold club shafts. In this example, the sheath may have a longitudinal length from about 80 cm to 150 cm and having a circumference of about 40 mm to 220 mm. The thermal chamber may be formed with a varied longitudinal length to accommodate the entire length of the ski pole. In a ski pole example, it is contemplated that one or more of the grips and/or the basket are removed for applying the sheath over the shaft. However, the sheath may, alternatively, be applied by passing the sheath over a grip. In this example, the process for applying a sheath to the pole, such as a ski pole, remains consistent. It is contemplated that termination tape may be applied near the basket and/or near the handle. It is also contemplated that the sheath extends to the basket such that the basket overlaps a portion of the sheath obviating the use of termination tape. Similarly, it is contemplated that the grip may extend over apportion of the sheath obviating the use of transfer tape proximate the grip.

The sheath contemplated herein in an example is formed from a sheet (e.g., a film) that overlaps itself forming an envelope or tubular structure. The overlapped portions of the sheet are bonded together, such as through a solvent weld, forming a seam in a longitudinal (e.g., the length) direction of the sheath. A non-limiting list of solvents effective for forming a welded joint include ethyl acetate, methyl ethyl ketone (MEK), and dichloromethane (DCM), as examples. A solvent useable for a solvent weld may be referred to as a seaming solvent in the industry. The longitudinal seam that is a solvent weld provides several advantages, discussed below, related to a heat-shrink structure for protecting an athletic equipment shaft. Alternatively, to solvent seaming, the joint may be formed with hot-bar (heat-sealing), laser-welding, or ultrasonic radiation A first advantage of a longitudinal joint (e.g., a seam), such as a solvent longitudinal weld, relates to a heat shrink material forming the sheath. It is desired to have a substantially uniform appearance proximate a joint following a shrinking operation to provide uniform appearance, uniform performance, and reduce distractions caused by lack of uniformity in the perception of a user of the shaft that is covered by the sheath. Utilizing a solvent bond to weld the overlap in the longitudinal direction allows a substantially uniform shrinkage of the material at the weld and away from the weld. This is in contrast to an adhesive (e.g., glue) bonded seam that relies on a bonding agent that interfaces between the overlapped sheet material. The bonding agent may not shrink consistently with the sheet material causing bulky seams, bumps, ripples, and other discontinuities in the sheath along the length and around the shaft. In alternative examples an adhesive seam is used and is effective.

The sheath, in an example, is formed having a substantially uniform inside circumference along the length of the sheath prior to heat shrinking. Stated differently, the width of the sheet material formed into the sheath (e.g., envelope, cylinder, tube, sleeve) is uniform along the length of the sheath allowing for a continuous length of a sheath to be cut to any length depending on the specific longitudinal length of the shaft to receive the sheath. This reduces waste and increases compatibility of the contemplated sheath in contrast to a material having a taper or variability in width/circumference along a length of the sheath material.

The sheath, in an example contemplated herein, is formed having a perforation along a portion or all of the longitudinal length. The longitudinal perforation is beneficial in the removal of the sheath from the shaft after application. As will be discussed herein, the material forming the sheet material that is used to form the sheath is contemplated as having relatively high shrinkability in the transverse direction (e.g., around the shaft) and having relatively minimal shrinkability in the longitudinal direction (e.g., the length of the shaft). Having directional shrinkability in the material results in enhanced tear resistance across the direction of shrinkability. Because the shrinkability is in the transverse direction, it is more difficult to tear the sheath in the longitudinal direction (e.g., difficult to tear across the polymeric chains oriented in the transverse direction) as compared to tearing in the transverse direction that is between the polymeric chains parallel to the tear direction. Inclusion of a longitudinal perforation facilitates tearing the sheath along the longitudinal direction even with the enhanced resistance of tearing creating by the desired transverse shrinkability. Stated differently, the sheath is formed to have a high shrinkability in the transverse direction, which makes ripping the sheath in the longitudinal direction difficult, but the inclusion of the longitudinal perforation overcomes the enhanced resistance to ripping/tearing of the sheath along the length of the shaft.

While many examples provided in connection with the sheath relate to a golf club and the associated golf club shaft, the sheath is contemplated as being applicable to other shafts, such as other athletic equipment shafts. Non-limiting examples of athletic equipment shafts includes poles (e.g., ski poles, tracking poles, fishing poles, pole vault poles, golf hole flag poles (i.e., a stick or pin extending from a golf hole)), bats (e.g., baseball bats, softball bats, cricket bats), racquets (e.g., tennis racquets, pickle ball racquets, table tennis paddles), sticks (e.g., lacrosse stick, hockey stick, field hockey stick), archery arrows, pool cues, dumbbells, barbells, and the like. Other shafts contemplated that benefit from the use of a heat-shrink sheath includes tent poles/legs, furniture legs/features, and the like.

The sheath is formed from a base sheet. The base sheet is a thermoplastic composition as a shrinkable film/sheet. The thermoplastic composition is responsive to a threshold thermal energy causing the thermoplastic composition to contract (i.e., shrink) in one or more dimensions. The thermoplastic composition, in an example, is comprised of at least one selected from a polyester-based composition, a polystyrene-based composition, a polyvinyl chloride-based composition (PVC), a polyolefin-based composition, a polyamide composition, an aramid composition, a polyimide composition, a polyphenylene sulfide composition, or an acrylic-based composition. In a specific example, the base sheet comprises polyethylene terephthalate glycol (PETG).

As used herein, the term composition may comprise a resin. For example, a polyester-based composition comprises a polyester-based resin.

The base sheet is not restricted to a particular polymeric composition, and any conventional well-known resin film can be used. In a specific example, any resin composition may form the base sheet so long as the resin film is solvent weldable to form a joint onto itself. As the resin film, a single kind or a mixture of two or more kinds of thermoplastic resins may be selected from, for example, a polyester-based resin, a polystyrene-based resin, a polyvinyl chloride-based resin, a polyolefin-based resin, a polyamide resin, an aramid resin, a polyimide resin, a polyphenylene sulfide resin, and an acrylic-based resin. A resin film made from the polyester-based resin, the polystyrene-based resin, or the polyolefin-based resin is contemplated in an example.

As a polyester-based resin, a polyethylene terephthalate (PET)-based resin, a poly (ethylene-2,6-naphthalene dicarboxylate) (PEN) resin, a polylactic acid (PLA) resin, or other resins may be used. The PET-based resin is contemplated in connection with athletic equipment applications among these resins. As the PET-based resin, the following resins can be used: polyethylene terephthalate (PET) containing terephthalic acid as a dicarboxylic acid component and ethylene glycol as a diol component; copolyester (CHDM copolymerized PET) containing terephthalic acid as a dicarboxylic acid component, ethylene glycol as the main component of a diol component, and 1,4cyclohexanedimethanol (CHDM) as a copolymer component; copolyester (NPG copolymerized PET) containing terephthalic acid as a dicarboxylic acid component, ethylene glycol as the main component of a diol component, and neopentyl glycol (NPG) as a copolymer component; diol-modified PET such as a copolyester containing terephthalic acid as a dicarboxylic acid component, ethylene glycol as the main component of a diol component, and diol component excluding ethylene glycol such as diethylene glycol as a copolymer component; dicarboxylic acid-modified PET containing terephthalic acid as a dicarboxylic acid component, ethylene glycol as the main component of a diol component, and dicarboxylic acid component excluding terephthalic acid as a copolymer component (in a dicarboxylic acid component, the resin contains terephthalic acid as the main component and is modified with isophthalic acid and/or adipic acid). Alternatively, PET containing a modification component in both of the diol component and the dicarboxylic acid component may be used.

It is contemplated, in an example, that in connection with an athletic equipment use, a PET-based resin is a composition forming at least a portion of the base sheet. In an example of an athletic equipment application, a modified PET that contains terephthalic acid as the main component of dicarboxylic acid and ethylene glycol as the main component of diol component may be leveraged.

Further, it is contemplated that the base sheet, in an example, is formed from a PET-based composition (e.g., PETG) that shrinks less than 10% in the transverse direction when exposed to thermal energy below 60 degrees C. This minimal shrinkage prevents the sheath from contracting during manufacturing (e.g., printing), storage, and shipping so that the sheath is capable of passing over elements on the shaft, such as a golf club grip, during installation. Additionally, it is contemplated that the base sheet is formed from a PET-based composition that is capable of shrinking between 11 and 80% when exposed to water measuring at 65 degrees C. to 100 degrees C. for 10 seconds in alignment with the other procedures outlined in ASTM D1204-14. A PET-based composition that is sufficiently stable below 65 degrees C. and capable of sufficient shrinkability between 65 degrees C. and 100 degrees C. is appropriate for application to the materials commonly found on a golf club (e.g., shaft material, adhesives, grip, labels, etc.) and other athletic equipment while still being able to be formed, stored, shipped, and applied by average consumers.

The heat shrinkage percentage of the base sheet in the direction perpendicular to the main drawing direction is at 15% or less, in another example it is 10% or less, and in yet another example it is 5% or less. The sheath is formed such that the main drawing direction of the base sheet is the circumferential direction of the sheath. Stated differently, the heat shrinkage percentage of the base sheet in the longitudinal direction is at 15% or less, in another example it is 10% or less, and in yet another example it is 5% or less.

Although the thickness of the base sheet is not limited to any particular range, the base sheet in an example has a thickness of 35 microns to 60 microns in an example and 45 microns to 50 microns in another example. The thickness of the base sheet is measured according to ASTM D374-99. A thickness less than 60 microns is effective to provide sufficient protection from scratches and scuffs to an underlying shaft without adding too much mass (e.g., less than 5 grams) to a shaft to materially affect performance and perceived weight by a user. A thickness greater than 35 microns provides sufficient protection to the underlying shaft.

In an example, the sheath is formed from a polymeric composition comprising PETG. PETG is effective as a shrink wrap composition for use on athletic equipment as it has a shrinkability exceeding 60% and up to 80% allowing for a practical shrink percentage discussed below that is appropriate for athletic equipment uses contemplated herein. Within this range the sheath can extend over a golf grip and still conform to a traditional golf club shaft proximate a ferrule, the smallest diameter location to be sheathed. PETG can also be a directional shrinkable material such that the sheath can be sized to a proximate length effective for covering a shaft prior to shrinking and the length remains within 10% of the length following shrinking while still achieving up to 80% shrinkability in the transverse direction. This allows for the sheath to be pre-sized in the longitudinal length prior to application to the shaft. Further, PETG can have a haze percentage less than 7%, which is effective for providing a transparent sheath that allows for inspection of the underlying shaft and for effectively providing transmission of an indicia printed on an inside surface of the sheath. Additionally, PETG can be formed in a thickness between 35 to 60 micros while still achieving the desired shrinkability and protection characteristics. At this thickness range the sheath is an effective covering for an athletic shaft, such as a golf club shaft, without interfering with a perceived performance of the shaft. PETG is also capable of achieving a sufficient tensile strength in the transverse direction of 200 to 300 Mpa. Within this tensile strength range the sheath is capable of sufficiently compressing around the shaft to remain in a fixed location without splitting, tearing, or otherwise deforming under a self-induced compression from the shrinking operation.

As provided above, other polymeric compositions are contemplated and may be used in the formation of the sheath. However, in an example for use in a golf club shaft application, PETG has proven to supply material characteristics that meet the above ranges. Specifically, a PETG film from Bonset America Corporation, BONPET 8A, is a non-limiting example of a PETG film option that satisfies the criteria provided in examples herein.

The measured circumference (or the doubled width of a substantially planar sheath, also referred to as a lay flat size) is contemplated as being 30 to 170 mm. In another example, the measured circumference is contemplated as being 40 to 155 mm (or a lay flat width of 20 to 77.5 mm). In another example, the measured circumference is contemplated as being 47 to 57 mm (or a lay flat width of 23.5 to 28.5 mm) for application to a golf club driver shaft. In another example, the measured circumference is contemplated as being 90 to 100 mm (or a lay flat width of 45 to 50 mm) for application to a golf club shaft where the sheath is intended to pass over a golf club grip. In another example, the measured circumference is contemplated as being 75 to 90 mm (or a lay flat width of 37.5 mm to 45 mm) for application to a non-driver golf club shaft where the sheath is not intended to pass over a golf club grip.

The circumference (or lay flat size doubled) of a contemplated sheath is important to reduce defects from a shrinking process of a sheath around an athletic shaft. For example, a typical shaft used with a driver (and some woods) has a butt end (i.e., grip end) circumference around 48 mm and a tip end (i.e., head end) circumference around 26 mm. A golf club shaft for an iron has a butt end (i.e., grip end) circumference around 47 mm and a tip end (i.e., head end) circumference around 28 mm. A typical golf club grip, at the butt end (e.g., distal end), has a circumference around 84 mm. Therefore, a sheath intended to pass over a grip must have a circumference that exceeds the grip's largest circumference while being able to effectively and without defect shrink to a circumference at the tip end. Therefore, for irons where a sheath is to be installed over a grip, the sheath will have a circumference greater than about 84 mm and still have the capacity to shrink down to a circumference of about 28 mm.

In light of the above with a specific focus on a golf club shaft application, it is contemplated, in a non-limiting example, that a sheath has longitudinal length of 850 to 950 mm and a circumference of 50 to 55 mm for application to a golf club driver having a removable golf club driver head. In an example, the driver shaft tapers from a circumference of about 47 mm proximate the grip to 26 mm proximate the driver head. In this example the sheath will have about a 45% shrinkage required at the driver head location of the shaft to conform with the driver shaft. In this example, the sheath is applied from the head end of the golf club shaft and therefore the sheath does not need to pass over the grip that may have a circumference of about 84 mm. In the example of a golf club driver shaft having a minimal circumference of about 25 mm, a sheath capable of passing over a traditional grip would need to shrink about 70%, which exceeds a consistent shrinkage percentage for a sheath formed from PETG that is consistently free from shrink-induced defects, in an example. Therefore, a golf club driver shaft is contemplated receiving a sheath sized smaller than the grip circumference and instead installed from the head end with a removable driver head and/or installed from the grip end with the grip removed.

A golf club that is a non-driver (e.g., irons, wedges, putter) traditionally has a larger circumference at the head end of the shaft than a driver shaft, as discussed above. In an example of a non-driver golf club shaft where a sheath passes over the grip, a maximum shrinkage is about 67% to conform the sheath to the shaft proximate the club head, which is below a consistent maximum shrinkage expected for a sheath formed from PETG. Therefore, a sheath formed from PETG, in an example, is capable of conforming to a non-driver shaft while still capable of passing over a traditional grip on the non-driver shaft.

In yet another example of a non-driver shaft it is contemplated that the grip may be removed such that a sheath having a circumference between 52 mm and 83 mm is effective to pass over the non-driver shaft at the grip end with the grip removed. In this example there is an expected maximum shrinkage of about 50%, which is well below an expected maximum consistent shrinkage for a sheath formed from PETG.

It has also been found that sufficient tolerances between a circumference of a sheath and a grip circumference are important for an ability to stope a sheath over a grip. Traditionally grips are formed from materials that have a relatively high COF to enhance playability and grip by a user during use. While advantageous for the play of the golf club, the COF of the grip can make sliding a sheath thereover difficult unless sufficient tolerance is provided between the sheath and the grip. Therefore, in an example, a sheath circumference of a sheath should exceed the largest circumference of the grip by at least 2 mm, in an example. Stated differently, to limit damage to a sheath during a donning operation, the sheath diameter should exceed the grip diameter by at least 2 mm, in a non-limiting example.

It is this enhanced circumference of the sheath relative to the grip that further exaggerates the shrink percentage necessary to contract to the shaft at the tip end. Therefore, a sheath having a 92 mm circumference, in a non-limiting example, is capable of passing over a traditional grip while still being able to contract to a tip end circumference of around 28 mm. This is roughly a 70% shrink percentage. However, the same 92 MM circumference sheath, in an example, has not been able to shrink without defects consistently to a tip size of 23 mm found on a driver. This is roughly a 75% shrink percentage. Therefore, in a non-limiting example, a PETG-based sheath has an effective shrink percentage less than 75% when applied to a golf club shaft. While the material forming the sheath is capable of shrinking more than 75%, the sheath does not consistently have a laminar (e.g., smooth) form on the underlying article following shrinking. Therefore, while capable of exceeding 75%, the potential for non-laminar final state limits example aspects to shrinkage rates less than 75% for a PETG-based sheath as applied to an article of sports equipment. Specific to a golf club shaft having a butt end circumference less than 50 mm, it is contemplated that the sheath circumference will not exceed 200 mm for a PETG-based sheath if a maximum shrink percentage of 75% is maintained.

EXAMPLE CLAUSES

The following clauses represent example embodiments of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A thermal chamber for heat shrinking a sheath on an athletic equipment shaft, the thermal chamber comprising: an enclosure defining an interior volume such that the interior volume is capable of holding a heat shrinkable sheath surrounding a portion of an athletic equipment shaft; a first shaft support aperture extending through a first end of the enclosure; a second shaft support aperture extending through a second end of the enclosure, wherein the first shaft support aperture and the second shaft support aperture are capable of supporting the athletic equipment shaft; and an inlet aperture extending through the first end of the enclosure, wherein the inlet aperture provides a fluid communication port allowing pressurized air to pass from an exterior of the enclosure to the interior volume.

Clause 2. The thermal chamber of clause 1, wherein the enclosure is a cylindrical structure extending between the first end and the second end.

Clause 3. The thermal chamber of any of the clauses, wherein the enclosure is a prism structure having at least five faces inclusive of the first end and the second end.

Clause 4. The thermal chamber of any of the clauses, wherein the enclosure is a rectangular prism having 6 rectangular faces inclusive of the first end and the second end.

Clause 5. The thermal chamber of any of the clauses, wherein the enclosure has a longitudinal length between 100 cm and 130 cm.

Clause 6. The thermal chamber of any of the clauses, wherein the enclosure is comprised of a first side, a second side, a third side, a fourth side, the first end, and the second end.

Clause 7. The thermal chamber of clause 6, wherein one or more of the first side, the second side, the third side, or the fourth side have a width between 10 cm and 20 cm.

Clause 8. The thermal chamber of clause 6, wherein the first side is hingedly joined with the second side to selectively expose the interior volume of the enclosure.

Clause 9. The thermal chamber of any of the clauses, wherein the thermal chamber comprises a shaft chamber portion and an air distribution chamber portion with an air distribution panel having a plurality of apertures extending there through separating the shaft chamber portion from the air distribution chamber portion such that the shaft chamber portion is a volume capable of maintaining the athletic equipment shaft and the air distribution chamber portion is a capable of distributing a positive air pressure into the shaft chamber portion.

Clause 10. The thermal chamber of clause 9, wherein the inlet aperture fluidly connects the air distribution chamber portion with the exterior.

Clause 11. The thermal chamber of clause 9, wherein the air distribution panel has a first plurality of apertures on a first half of a longitudinal length of the air distribution panel and a second plurality of apertures on a second half of the longitudinal length of the air distribution panel, wherein the first plurality of apertures have a first area of aperture and the second plurality of apertures have a second area of apertures, the first area of apertures is less than the second area of apertures.

Clause 12. The thermal chamber of clause 11, wherein the first plurality of apertures are closer to the inlet aperture than the second plurality of apertures.

Clause 13. The thermal chamber of clause 9, wherein the first support aperture extends into the shaft chamber portion.

Clause 14. The thermal chamber of any of the clauses, wherein the first support aperture has a first width, and the second support aperture has a second width, the first width is greater than the second width.

Clause 15. The thermal chamber of any of the clauses, wherein the first support aperture and the second support aperture are slots extending from a top edge of the first end and a top edge of the second end, respectively.

Clause 16. The thermal chamber of any of the clauses, wherein the inlet aperture has an area between 12 cm$^2$ and 62 cm$^2$.

Clause 17. The thermal chamber of any of the clauses, wherein at least a portion of the enclosure is formed from a corrugated composition.

Clause 18. A thermal chamber, the thermal chamber comprising: an enclosure defining an interior volume such that the interior volume is capable of holding a heat shrinkable sheath surrounding a portion of an athletic equipment shaft, wherein the enclosure has a longitudinal length between 100 cm and 130 cm and the enclosure comprises: a shaft chamber portion, an air distribution chamber portion, and an air distribution panel having a plurality of apertures extending there through, the air distribution panel separating the shaft chamber portion from the air distribution chamber portion such that the shaft chamber portion is a volume capable of maintaining the athletic equipment shaft and the air distribution chamber portion is capable of distributing a positive air pressure into the shaft chamber portion; and an inlet aperture extending through a first end of the enclosure, wherein the inlet aperture provides a fluid communication port allowing pressurized air to pass from an exterior of the enclosure to the interior volume and the inlet aperture has an area between 12 cm$^2$ and 62 cm$^2$.

Clause 19. A corrugated cardboard thermal chamber, the thermal chamber comprising: an enclosure defining an interior volume such that the enclosure comprises an article chamber portion, an air distribution chamber portion, and an air distribution panel having a plurality of apertures extending there through, the air distribution panel separating the article chamber portion from the air distribution chamber portion such that the article chamber portion is a volume capable of maintaining the article and the air distribution chamber portion is capable of distributing a positive air pressure into the article chamber portion; an inlet aperture extending through a first end of the enclosure, wherein the inlet aperture provides a fluid communication port allowing pressurized air to pass from an exterior of the enclosure to the interior volume; and a viewing window.

Clause 20. The corrugated cardboard thermal chamber of clause 19 further comprising a window to the article chamber, the window formed in the enclosure.

Clause 21. A method of using a thermal chamber for heat shrinking a sheath on an athletic equipment shaft, the method comprising: inserting at least a portion of the athletic equipment shaft having a heat-shrink sheath surrounding a portion of the athletic equipment shaft into an interior volume of the thermal chamber; applying thermal energy into the interior volume of the thermal chamber such that a temperature within the interior volume exceeds 60 degrees C.; maintaining the temperature within the interior volume above 60 degrees Celsius for at least 1 minute; and removing the athletic equipment shaft from the interior volume, wherein the heat-shrink sheath reduced in size from a first size prior to applying the thermal energy to a second size after maintaining the temperature within the interior volume above 60 degrees Celsius.

Clause 22. The method of clause 21, wherein the thermal chamber comprises an enclosure defining the interior volume; a first shaft support aperture extending through a first end of the enclosure; a second shaft support aperture extending through a second end of the enclosure, wherein the first shaft support aperture and the second shaft support aperture are capable of supporting the athletic equipment shaft; and an inlet aperture extending through the first end of the enclosure, wherein the inlet aperture provides a fluid communication port allowing pressurized air supplying the thermal energy to pass from an exterior of the enclosure to the interior volume.

Clause 23. The method of clause 21, wherein the thermal chamber comprises an enclosure defining the interior, wherein the enclosure has a longitudinal length between 100 cm and 130 cm and the enclosure comprises: a shaft chamber portion, an air distribution chamber portion, and an air distribution panel having a plurality of apertures extending there through, the air distribution panel separating the shaft chamber portion from the air distribution chamber portion such that the shaft chamber portion is a volume capable of maintaining the athletic equipment shaft and the air distribution chamber portion is capable of distributing a positive air pressure into the shaft chamber portion; and an inlet aperture extending through a first end of the enclosure, wherein the inlet aperture provides a fluid communication port allowing pressurized air to pass from an exterior of the enclosure to the interior volume and the inlet aperture has an area between 12 cm$^2$ and 62 cm$^2$.

Clause 24. The method of clause 21, wherein the thermal chamber comprises an enclosure defining the interior volume such that the interior volume, the enclosure comprises an article chamber portion, an air distribution chamber portion, and an air distribution panel having a plurality of apertures extending there through, the air distribution panel separating the article chamber portion from the air distribution chamber portion such that the shaft chamber portion is a volume capable of maintaining the article and the air distribution chamber portion is capable of distributing a positive air pressure into the article chamber portion; and an inlet aperture extending through a first end of the enclosure, wherein the inlet aperture provides a fluid communication port allowing pressurized air to pass from an exterior of the enclosure to the interior volume.

Clause 25. The method of any method clauses, wherein, prior to applying thermal energy, the heat-shrink sheath has a length between 725 and 950 mm and a circumference between 47 and 200 mm.

Clause 26. The method of any method clauses, wherein inserting comprises positioning a portion of the athletic equipment shaft on a first support aperture formed in the thermal chamber, and wherein a portion of the athletic equipment shaft extends outside of the interior volume proximate the first support aperture.

Clause 27. The method of any method clauses, wherein inserting comprises positioning a second portion of the athletic equipment shaft on a second support aperture formed in the thermal chamber, wherein another portion of the athletic equipment shaft extends outside of the interior volume proximate the second support aperture.

Clause 28. The method of any method clauses, wherein at least one end of the athletic equipment shaft is positioned outside of the interior volume.

Clause 29. The method of any method clauses, wherein a first end of the athletic equipment shaft is positioned outside of the interior volume and a second end of the athletic equipment shaft is positioned inside of the interior volume.

Clause 30. The method of any method clauses, wherein the applying comprises electrifying a heating element and a fan.

Clause 31. The method of any method clauses, wherein the temperature within the interior volume is maintained above 76 degrees Celsius and less than 105 degrees Celsius.

Clause 32. The method of any method clauses, wherein the athletic equipment shaft is a golf club shaft.

Clause 33. The method of any method clauses, wherein the athletic equipment shaft is a golf club shaft, and a club end of the golf club shaft extends outside of the interior volume.

Clause 34. The method of any method clauses, wherein the sheath comprises PETG.

Clause 35. The method of any method clauses further comprising securing a top portion and/or a front portion of the thermal chamber closed to substantially enclose the interior volume.

Clause 36. The method of clause 35, wherein the athletic equipment shaft is removed from the interior volume within 10 minutes of securing the top portion.

Clause 37. The method of clause 35, wherein the securing comprises inserting a fastener through the top portion into a portion of a wall of the thermal chamber.

Clause 38. The method of any method clauses further comprising rotating the athletic equipment shaft during the maintaining the temperature within the interior volume above 60 degrees Celsius for at least 1 minute.

Clause 39. The method of any method clauses, wherein the maintaining the temperature within the interior volume above 60 degrees Celsius for at least 1 minute does not exceed ten consecutive minutes prior to removing the athletic equipment shaft.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The present disclosure focused on athletic equipment shafts onto which the sheath may be applied, the thermal chamber contemplated herein may be applied in other situations, such as the application of a heat-shrink sheath to a non-athletic equipment shaft. Therefore, the above disclosure is contemplated as being applicable to all implementations of heat-shrinking a sheath to an article, such as a shaft.

It should be noted that some of the terms used herein may be relative terms. For example, the terms "upper" and "lower" and the terms "forward" (or "front") and "rearward" (or "back") are relative to each other in location, i.e. an upper component is located at a higher elevation than a lower component in a given orientation, but these terms may change if the device is flipped. An intermediate component, on the other hand, is always located between an upper component and a lower component regardless of orientation.

The terms "horizontal" and "vertical" are used to indicate direction relative to an absolute reference, i.e., ground level. However, these terms should not be construed to require structures to be absolutely parallel or absolutely perpendicular to each other. For example, a first vertical structure and a second vertical structure are not necessarily parallel to each other. The terms "top" and "bottom" are used to refer to surfaces where the top is always higher than the bottom relative to an absolute reference, i.e., the surface of the earth when the component is used as intended. The terms "upwards" or "upwardly" and "downwards" or "downwardly" are also relative to an absolute reference; upwards is always against the gravity of the earth. The terms "forward" and "rearward" or "rear" with respect to a position or orientation are opposite one another along a common direction, and an "intermediate" position is always located between a forward position and a rearward position.

The terms "operative to" and "configured to" and similar terms are used herein to describe that a particular component has certain structural features designed to perform a designated function. Such components should be construed as having the expressed structure, with the designated function being considered part of the structure. The term "engage," and similar terms are used herein to describe the interaction between particular components and does not necessarily require that such components contact one another (directly or indirectly).

Unless indicated otherwise, all measurements provided herein are taken when component(s) is at standard ambient temperature and pressure (298.15 K and 100 kPa). As used herein, the terms "substantially" and "about" mean within +5% of an indicated value unless provided to the contrary.

The term "proximate" refers to a location that is near but not required to be at or on a location. Instead, the term proximate takes into consideration intervening structures, components, and the like that prevent a location to overlap, but takes into consideration an equivalent.

This detailed description is provided in order to meet statutory requirements. However, this description is not intended to limit the scope of the invention described herein. Rather, the claimed subject matter may be embodied in different ways, to include different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

The invention claimed is:

1. A thermal chamber for heat shrinking a sheath on an athletic equipment shaft, the thermal chamber comprising:
   an enclosure defining an interior volume such that the interior volume is capable of holding a heat shrinkable sheath surrounding a portion of an athletic equipment shaft;
   a first shaft support aperture extending through a first end of the enclosure;
   a second shaft support aperture extending through a second end of the enclosure, wherein the first shaft support aperture and the second shaft support aperture are capable of supporting the athletic equipment shaft; and
   an inlet aperture extending through the first end of the enclosure, wherein the inlet aperture provides a fluid communication port allowing pressurized air to pass from an exterior of the enclosure to the interior volume.

2. The thermal chamber of claim 1, wherein the enclosure is a cylindrical structure extending between the first end and the second end.

3. The thermal chamber of claim 1, wherein the enclosure is a prism structure having at least five faces inclusive of the first end and the second end.

4. The thermal chamber of claim 1, wherein the enclosure is a rectangular prism having 6 rectangular faces inclusive of the first end and the second end.

5. The thermal chamber of claim 1, wherein the enclosure has a longitudinal length between 100 cm and 130 cm.

6. The thermal chamber of claim 1, wherein the enclosure is comprised of a first side, a second side, a third side, a fourth side, the first end, and the second end.

7. The thermal chamber of claim 6, wherein one or more of the first side, the second side, the third side, or the fourth side have a width between 10 cm and 20 cm.

8. The thermal chamber of claim 6, wherein the first side is hingedly joined with the second side to selectively expose the interior volume of the enclosure.

9. The thermal chamber of claim 1, wherein the thermal chamber comprises a shaft chamber portion and an air distribution chamber portion with an air distribution panel having a plurality of apertures extending there through separating the shaft chamber portion from the air distribution chamber portion such that the shaft chamber portion is a volume capable of maintaining the athletic equipment shaft and the air distribution chamber portion is a capable of distributing a positive air pressure into the shaft chamber portion.

10. The thermal chamber of claim 9, wherein the inlet aperture fluidly connects the air distribution chamber portion with the exterior.

11. The thermal chamber of claim 9, wherein the air distribution panel has a first plurality of apertures on a first half of a longitudinal length of the air distribution panel and a second plurality of apertures on a second half of the longitudinal length of the air distribution panel, wherein the first plurality of apertures have a first area of aperture and the second plurality of apertures have a second area of apertures, the first area of apertures is less than the second area of apertures.

12. The thermal chamber of claim 11, wherein the first plurality of apertures are closer to the inlet aperture than the second plurality of apertures.

13. The thermal chamber of claim 9, wherein the first shaft support aperture extends into the shaft chamber portion.

14. The thermal chamber of claim 1, wherein the first shaft support aperture has a first width, and the second shaft support aperture has a second width, the first width is greater than the second width.

15. The thermal chamber of claim 1, wherein the first shaft support aperture and the second shaft support aperture are slots extending from a top edge of the first end and a top edge of the second end, respectively.

16. The thermal chamber of claim 1, wherein the inlet aperture has an area between 12 cm$^2$ and 62 cm$^2$.

17. The thermal chamber of claim 1, wherein at least a portion of the enclosure is formed from a corrugated composition.

18. A thermal chamber, the thermal chamber comprising:
an enclosure defining an interior volume such that the interior volume is capable of holding a heat shrinkable sheath surrounding a portion of an athletic equipment shaft, wherein the enclosure has a longitudinal length between 100 cm and 130 cm and the enclosure comprises:
a shaft chamber portion,
an air distribution chamber portion, and
an air distribution panel having a plurality of apertures extending there through, the air distribution panel separating the shaft chamber portion from the air distribution chamber portion such that the shaft chamber portion is a volume capable of maintaining the athletic equipment shaft and the air distribution chamber portion is capable of distributing a positive air pressure into the shaft chamber portion; and
an inlet aperture extending through a first end of the enclosure, wherein the inlet aperture provides a fluid communication port allowing pressurized air to pass from an exterior of the enclosure to the interior volume and the inlet aperture has an area between 12 cm$^2$ and 62 cm$^2$.

19. A thermal chamber comprising a corrugated composition, the thermal chamber comprising:
an enclosure defining an interior volume such that the enclosure comprises an article chamber portion, an air distribution chamber portion, and an air distribution panel having a plurality of apertures extending there through, the air distribution panel separating the article chamber portion from the air distribution chamber portion such that the article chamber portion is a volume capable of maintaining an article and the air distribution chamber portion is capable of distributing a positive air pressure into the article chamber portion; and
an inlet aperture extending through a first end of the enclosure, wherein the inlet aperture provides a fluid communication port allowing pressurized air to pass from an exterior of the enclosure to the interior volume.

20. The thermal chamber of claim 19 further comprising a viewing window to the article chamber portion, the viewing window formed in the enclosure.

* * * * *